US012072642B2

(12) United States Patent
Ito et al.

(10) Patent No.: US 12,072,642 B2
(45) Date of Patent: Aug. 27, 2024

(54) INTEGRATED LIGHT SOURCE MODULE

(71) Applicant: TDK CORPORATION, Tokyo (JP)

(72) Inventors: Kuniyasu Ito, Tokyo (JP); Tsuyoshi Komaki, Tokyo (JP); Hideaki Fukuzawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/827,252

(22) Filed: May 27, 2022

(65) Prior Publication Data
US 2022/0382181 A1  Dec. 1, 2022

(30) Foreign Application Priority Data

May 31, 2021  (JP) ................................. 2021-091209
Mar. 25, 2022  (JP) ................................. 2022-050711

(51) Int. Cl.
*G03G 15/04*  (2006.01)
*F21V 8/00*  (2006.01)

(52) U.S. Cl.
CPC ....... *G03G 15/0409* (2013.01); *G02B 6/0068* (2013.01); *G02B 6/0078* (2013.01); *G03G 15/04072* (2013.01)

(58) Field of Classification Search
CPC ......... G03G 15/0409; G03G 15/04072; G02B 6/0068; G02B 6/0078
See application file for complete search history.

(56) References Cited

U.S. PATENT DOCUMENTS

| | | | |
|---|---|---|---|
| 2005/0093965 A1* | 5/2005 | Narayan | ................. B41J 2/451 347/238 |
| 2009/0297223 A1 | 12/2009 | Suzuki | |
| 2010/0046884 A1* | 2/2010 | Presley | ................. G02B 6/356 385/17 |

FOREIGN PATENT DOCUMENTS

| | | |
|---|---|---|
| CN | 111465879 A | 7/2020 |
| JP | 2000-329951 A | 11/2000 |
| JP | 2002-323629 A | 11/2002 |
| JP | 2008-145734 A | 6/2008 |
| JP | 2009-286048 A | 12/2009 |
| JP | 2012-043852 A | 3/2012 |
| JP | 5585292 B2 | 9/2014 |
| WO | 2020/196489 A1 | 10/2020 |

OTHER PUBLICATIONS

Translation of Sep. 18, 2023 Office Action issued in Chinese Application No. 202210588055.3.
Translation of Feb. 6, 2024 Office Action issued in Chinese Application 202210588055.3.

* cited by examiner

*Primary Examiner* — Abdulmajeed Aziz
*Assistant Examiner* — Jessica M Apenteng
(74) *Attorney, Agent, or Firm* — Oliff PLC

(57) ABSTRACT

A integrated light source module includes a planar optical waveguides layer having N light incident ports aligned with respect to each other, M light exit ports aligned with respect to each other, and optical waveguides connected to the N light incident ports and the M light exit ports, and N optical semiconductor devices facing each of the N light incident ports arranged so that light emitted from each of the N optical semiconductor devices can be incident on each of the N light incident ports, wherein light emitted from the M light exit ports can be applied to an object to be irradiated.

13 Claims, 12 Drawing Sheets

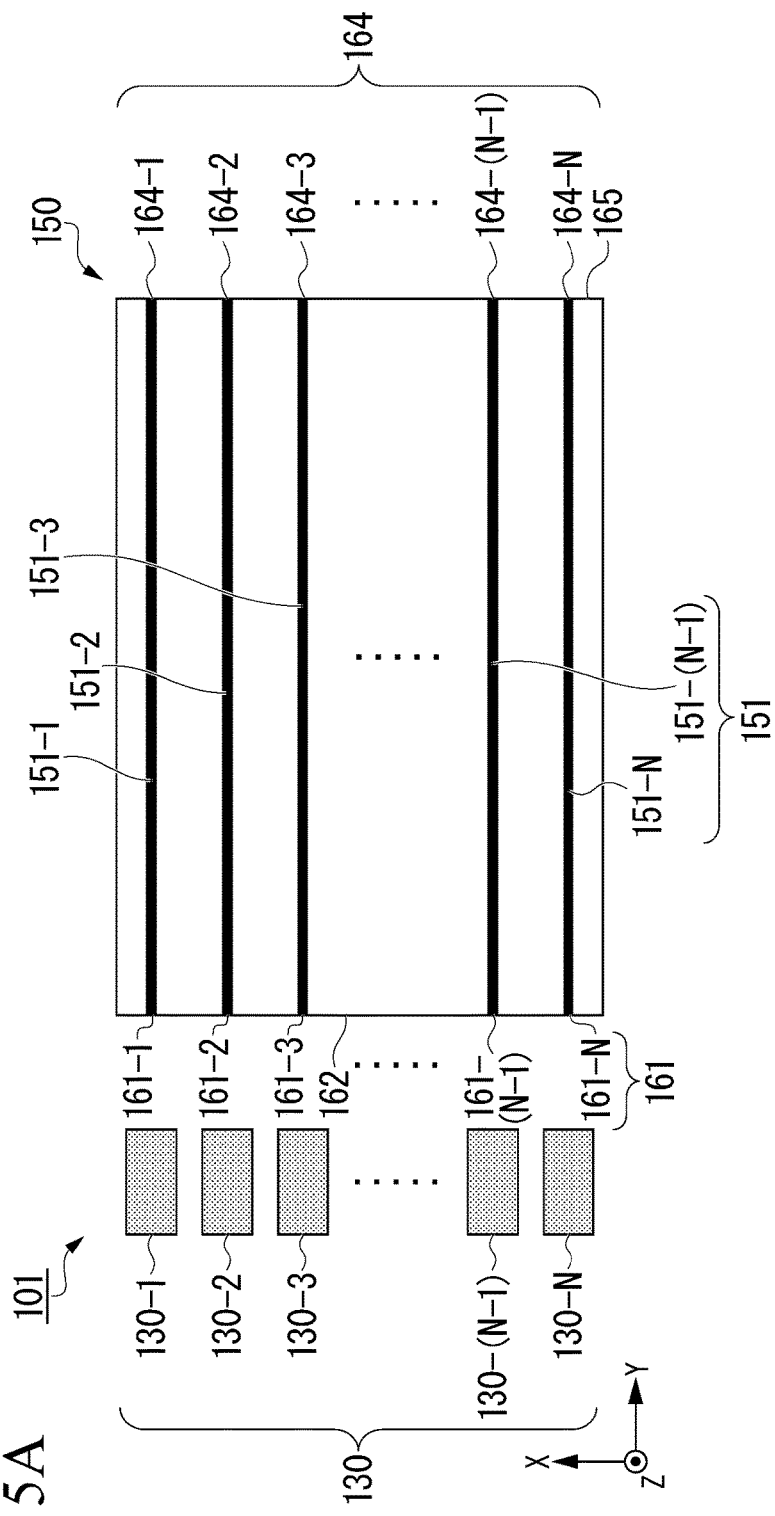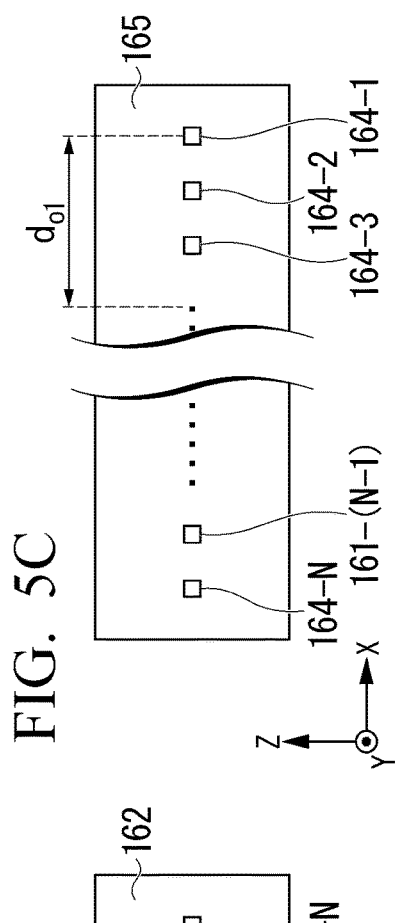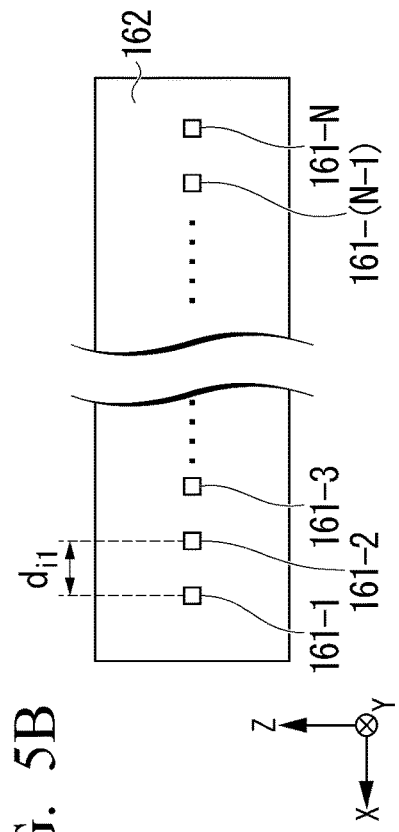
FIG. 5A
FIG. 5B
FIG. 5C

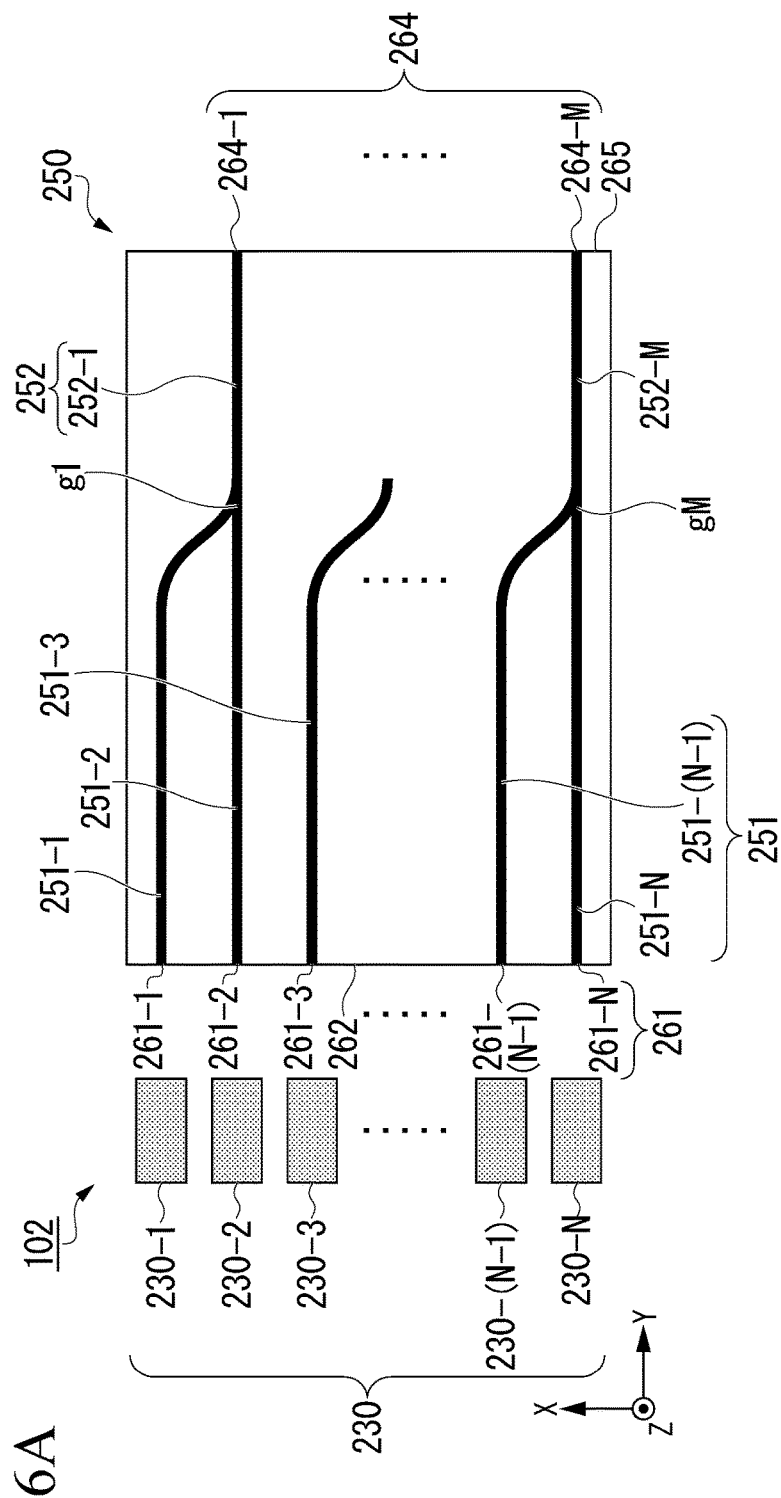
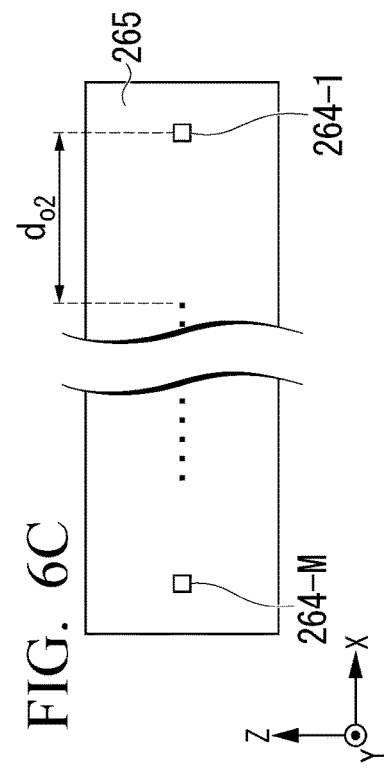
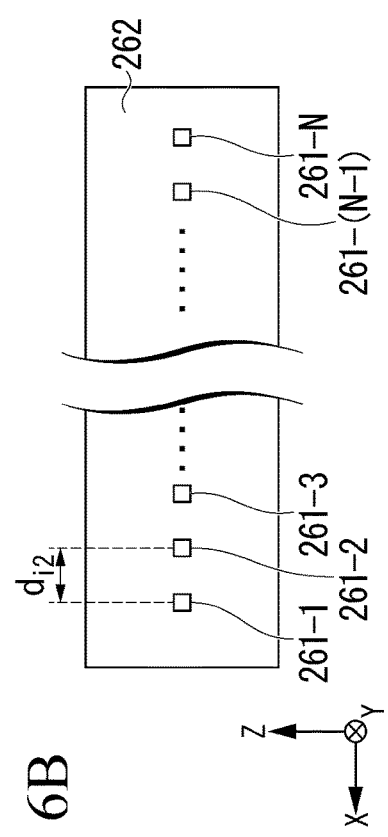
FIG. 6A
FIG. 6C
FIG. 6B

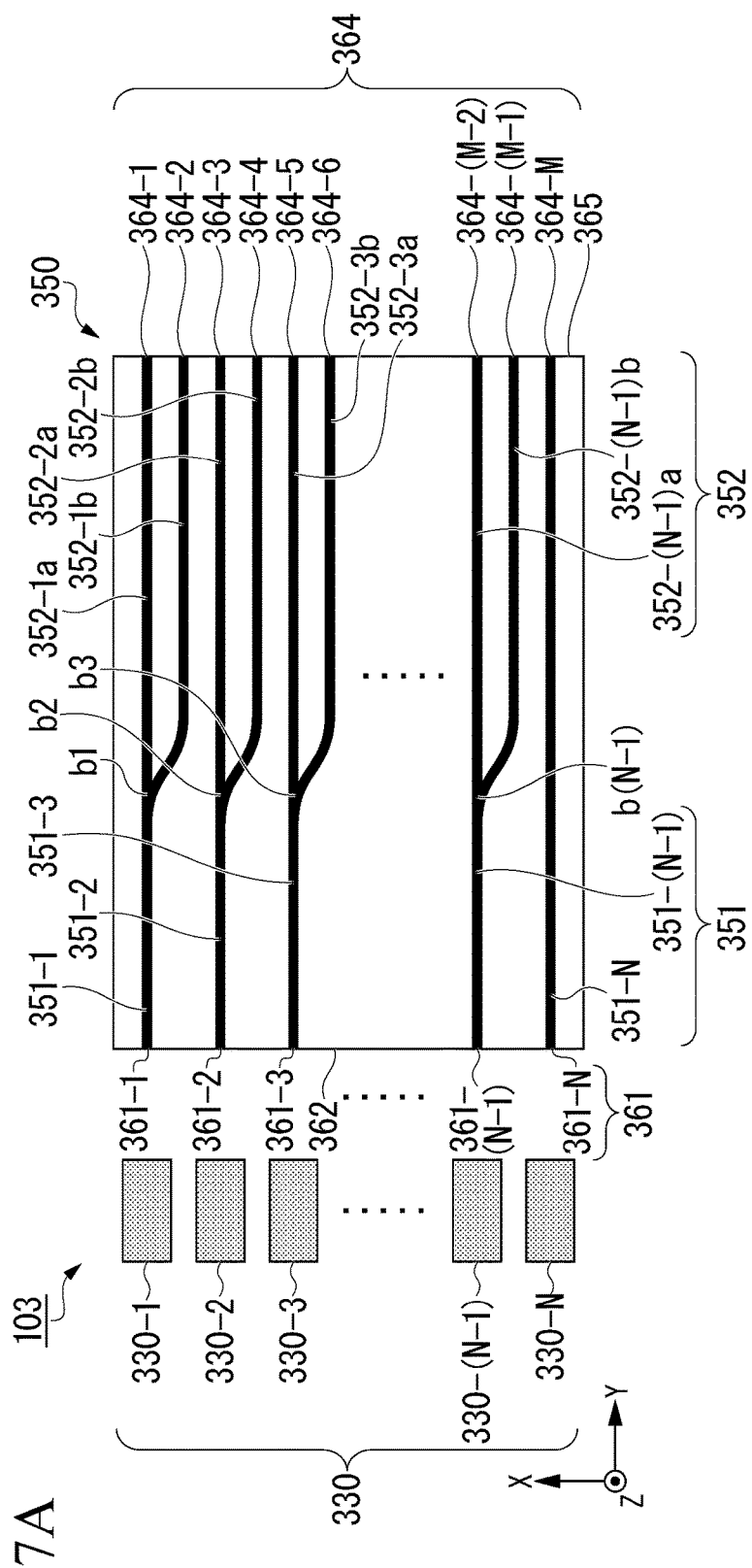
FIG. 7A
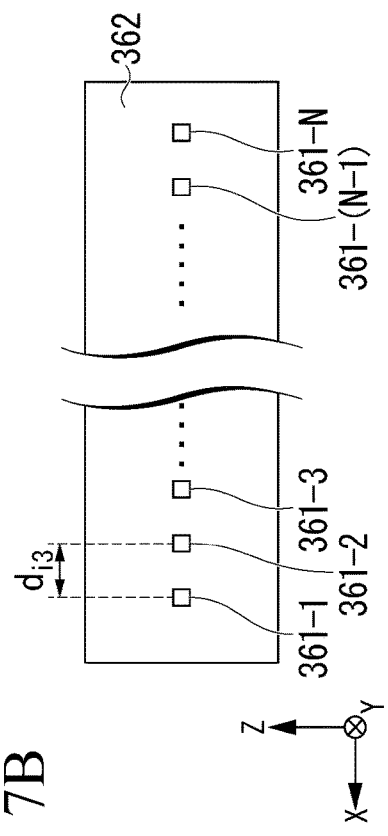
FIG. 7B
FIG. 7C

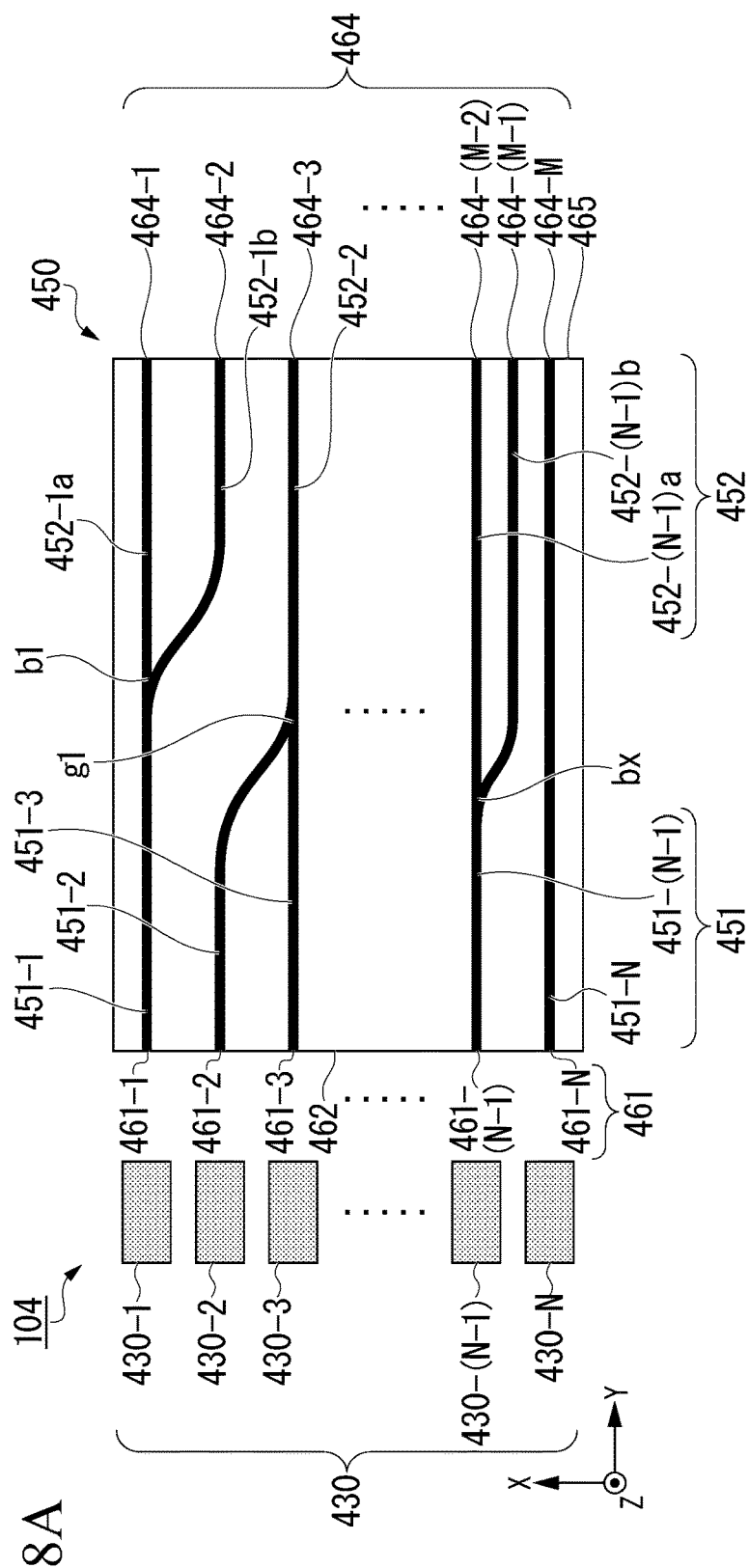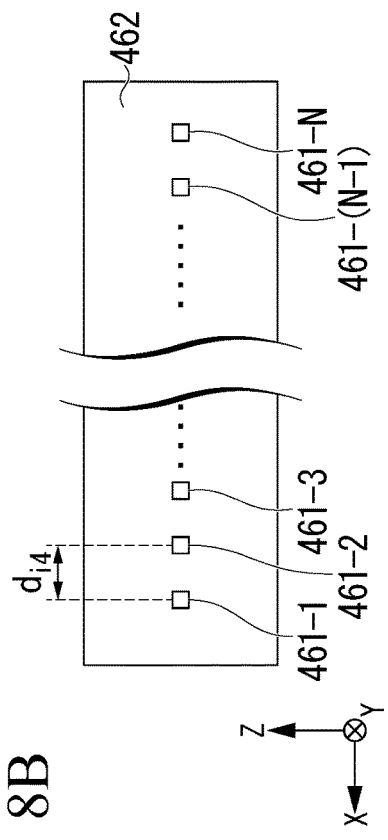
FIG. 8A
FIG. 8B
FIG. 8C

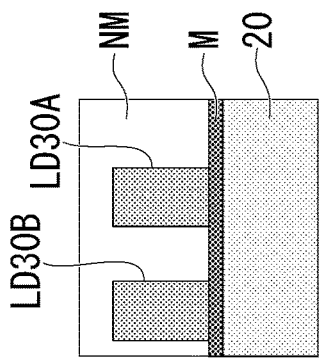
FIG. 12A
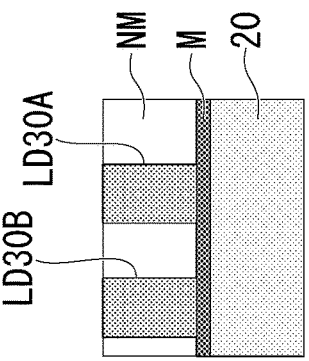
FIG. 12B
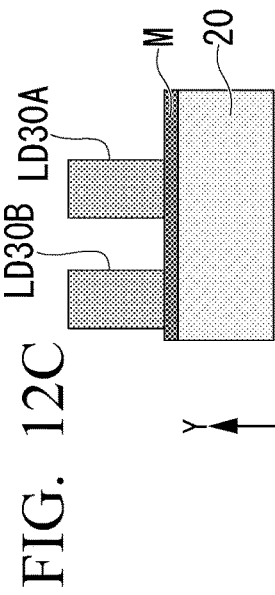
FIG. 12C
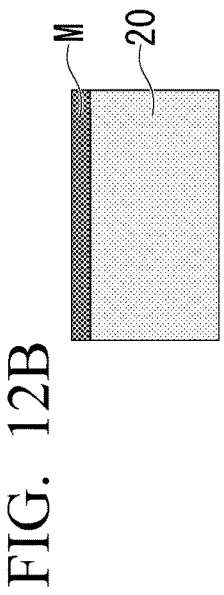
FIG. 12D
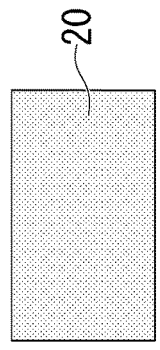
FIG. 12E
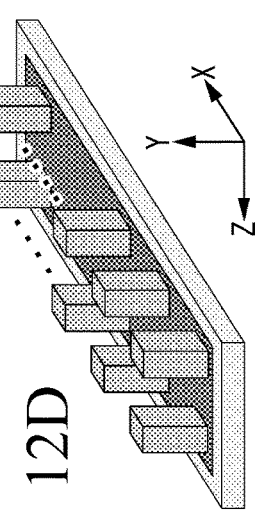
FIG. 12F
FIG. 12G

INTEGRATED LIGHT SOURCE MODULE

TECHNICAL FIELD

The present disclosure relates to an integrated light source module.

Priority is claimed on Japanese Patent Application No. 2021-091209, filed May 31, 2021, and Japanese Patent Application No. 2022-050711, filed Mar. 25, 2022, the content of which is incorporated herein by reference.

BACKGROUND ART

As an optical head used in an image forming apparatus such as a printer, a copier, or a facsimile that employs an electrophotographic printing method, an LED print head in which LEDs (light emitting diodes) are arranged in an array is known (for example, Patent Literature 1). In an electrophotographic image forming apparatus, a uniformly charged photoconductor is irradiated with light by a printhead to form an electrostatic latent image on the photoconductor, toner is applied to the formed electrostatic latent image, a toner image is formed on the photoconductor, and the toner is transferred to paper and fixed to perform printing.

A printhead in which LEDs are replaced with semiconductor lasers is also known (for example, Patent Literature 2).

CITATION LIST

Patent Literature

[Patent Literature 1] Japanese Patent Publication No. 5585292

[Patent Literature 2] Japanese Unexamined Patent Application, First Publication No. 2009-286048

SUMMARY OF THE INVENTION

Technical Problem

Since the LED emits light with a Lambersian distribution, an efficiency of light extraction is low. The basic configuration of an LED printhead is to have a condenser lens directly above the LED in order to improve the efficiency of light extraction (see Patent Document 1). Because of this configuration, it has been difficult for LED printheads to be highly integrated due to problems such as optical characteristics.

Further, in a printhead in which LEDs in an LED printhead are replaced with semiconductor lasers, a lens is used to increase the peak output of the semiconductor lasers (see Patent Document 2). The point that a lens is required is the same as that of an LED printhead, and it is also difficult to achieve high integration.

The present disclosure has been made in view of the above problems, and an object of the present disclosure is to provide an integrated light source module capable of high integration by combining optical semiconductor devices and a planar lightwave circuit.

Solution to Problem

The present disclosure provides the following means to resolve the above problems.

According to an aspect of the present disclosure, there is provided an integrated light source module, including a planar optical waveguides layer having N light incident ports aligned with respect to each other, M light exit ports aligned with respect to each other, and optical waveguides connected to the N light incident ports and the M light exit ports; and N optical semiconductor devices facing each of the N light incident ports arranged so that light emitted from each of the N optical semiconductor devices can be incident on each of the N light incident ports, wherein light emitted from the M light exit ports can be applied to an object to be irradiated.

In the integrated light source module according to the aspect, the number of the light incident ports (N) and the number of the light exit ports (M) may be different.

In the integrated light source module according to the aspect, the number of the light exit ports (M) may be less than the number of the light incident ports (N).

In the integrated light source module according to the aspect, the number of the light exit ports (M) may be larger than the number of the light incident ports (N).

In the integrated light source module according to the aspect, at least some of the intervals between the light incident ports adjacent to each other of the N light incident ports may be different.

In the integrated light source module according to the aspect, the optical semiconductor devices may be semiconductor laser devices, and of the N semiconductor laser devices, at least some of the semiconductor laser devices may output laser light with a frequency different from that of other semiconductor laser devices.

In the integrated light source module according to the aspect, the optical semiconductor devices may be semiconductor laser devices, and all N semiconductor laser devices may output laser light having the same frequency, and wherein the frequencies of the laser lights output from at least some of the M light exit ports of the planar optical waveguides layer may be different.

In the integrated light source module according to the aspect, the integrated light source module may be a printhead.

In the integrated light source module according to the aspect, a plurality of the planar optical waveguides layers may be laminated, and a plurality of layers of the N optical semiconductor devices corresponding to the plurality of the planar optical waveguides layers may be laminated.

In the integrated light source module according to the aspect, a reflective film may be provided between the planar optical waveguides layers arranged adjacent to each other.

Advantageous Effects of Invention

According to the present disclosure, it is possible to provide an integrated light source module that can be highly integrated by combining optical semiconductor devices and a planar optical waveguides layer.

BRIEF DESCRIPTION OF THE DRAWINGS

FIG. 5A is a plan view conceptually showing an integrated light source module, which includes a planar optical waveguides layer having a configuration in which the number of light incident ports (N) and the number of light exit ports (M) are the same. FIG. 5B is a front view of the planar optical waveguides layer of the integrated light source module shown in FIG. 5A as viewed from the incident surface side provided with the light incident ports. FIG. 5C is a front view of the planar optical waveguides layer of the integrated light source module shown in FIG. 5A as viewed from the exit surface side provided with the light exit ports.

FIG. 6A is a plan view conceptually showing an integrated light source module, which includes a planar optical waveguides layer having a configuration in which the number of light exit ports is smaller than the number of light incident port. FIG. 6B is a front view of a planar optical waveguides layer of the integrated light source module shown in FIG. 6A as viewed from the incident surface side provided with the light incident ports. FIG. 6C is a front view of a planar optical waveguides layer of the integrated light source module viewed in FIG. 6A as viewed from the exit surface side provided with the light exit ports.

FIG. 7A is a plan view conceptually showing an integrated light source module, which includes a planar optical waveguides layer having a configuration in which the number of light incident ports is smaller than the number of light exit ports. FIG. 7B is a front view of the planar optical waveguides layer of the integrated light source module shown in FIG. 7A as viewed from the incident surface side provided with the light incident ports. FIG. 7C is a front view of the planar optical waveguides layer of the integrated light source module shown in FIG. 7A as viewed from the exit surface side provided with the light exit ports.

FIG. 8A is a plan view conceptually showing an integrated light source module, which includes a planar optical waveguides layer having a configuration in which the first to third embodiments of the planar optical waveguides layers are combined. FIG. 8B is a front view of the planar optical waveguides layer of the integrated light source module shown in FIG. 8A as viewed from the incident surface side provided with the light incident ports. FIG. 8C is a front view of the planar optical waveguides layer of the integrated light source module shown in FIG. 8A as viewed from the exit surface side provided with the light exit ports.

FIG. 11A shows a first step of producing the first plane optical waveguide layer, FIG. 11B shows a second step thereof, FIG. 11C is a third step thereof, FIG. 11D is a fourth step thereof. FIG. 11E shows a first step of producing the second plane optical waveguide layer thereof, FIG. 11F shows the second step thereof, FIG. 11G shows the third step thereof, and FIG. 11H shows the fourth step thereof.

FIGS. 12A to 12G are cross-sectional schematic diagrams showing each process of the method of laminating a plurality of LD layers, FIG. 12A shows a first step, FIG. 12B shows a second step, FIG. 12C shows a third step, FIG. 12D shows a schematic perspective view after the third step. FIG. 12E shows a fourth step, FIG. 12F shows a fifth step, FIG. 12G shows a diagram joining a LD part and a PLC part.

DESCRIPTION OF EMBODIMENTS

Hereinafter, the present disclosure will be described in detail with reference to the drawings as appropriate. The drawings used in the following description may be enlarged for convenience in order to make the features of the present disclosure easy to understand, and the dimensional ratios of each component may differ from the actual ones. The materials, dimensions, and the like exemplified in the following description are examples, and the present disclosure is not limited thereto, and can be appropriately modified and carried out within the range in which the effects of the present disclosure are exhibited.

Figure 1:
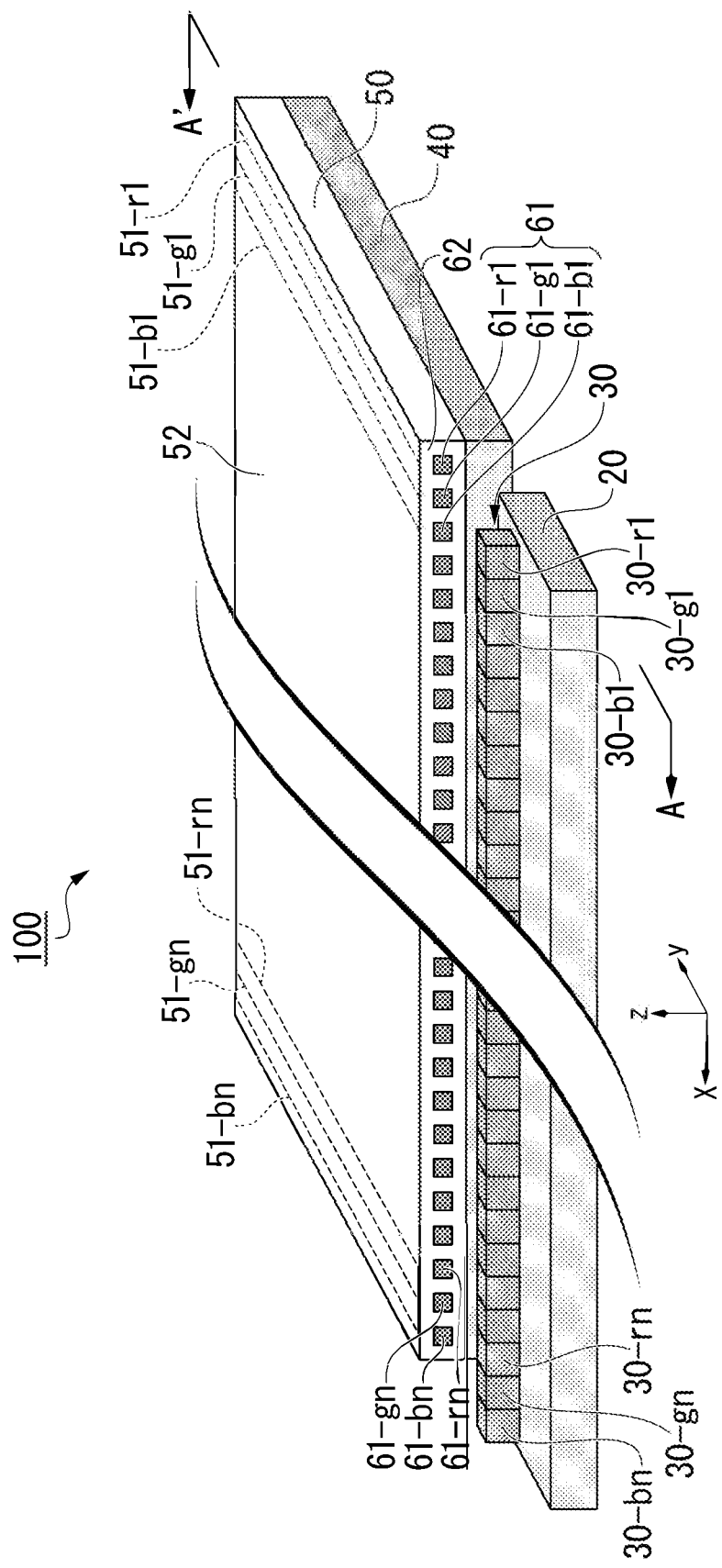
FIG. 1 is a schematic perspective view of an integrated light source module according to an embodiment.
Figure 2:
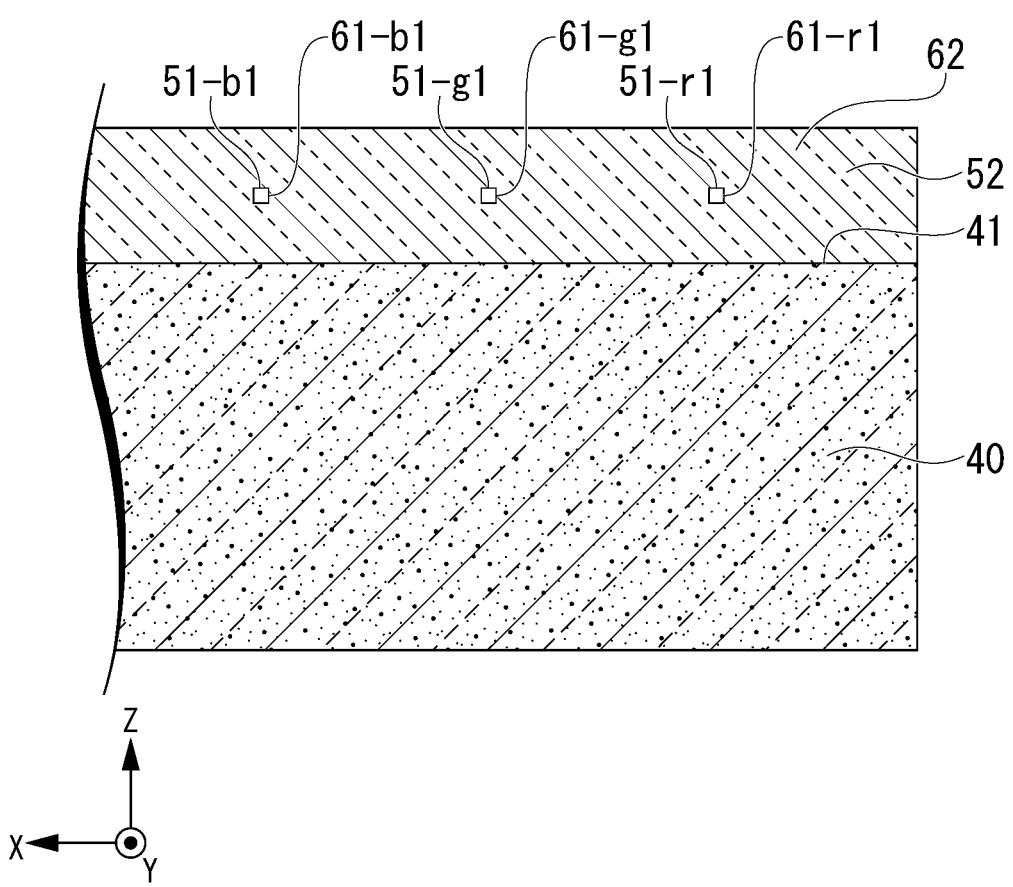
FIG. 2 is a front schematic view of a part of the incident surface on which light incident ports of a planar optical waveguides layer of the integrated light source module shown in FIG. 1 is arranged, as viewed from the front.
Figure 3:
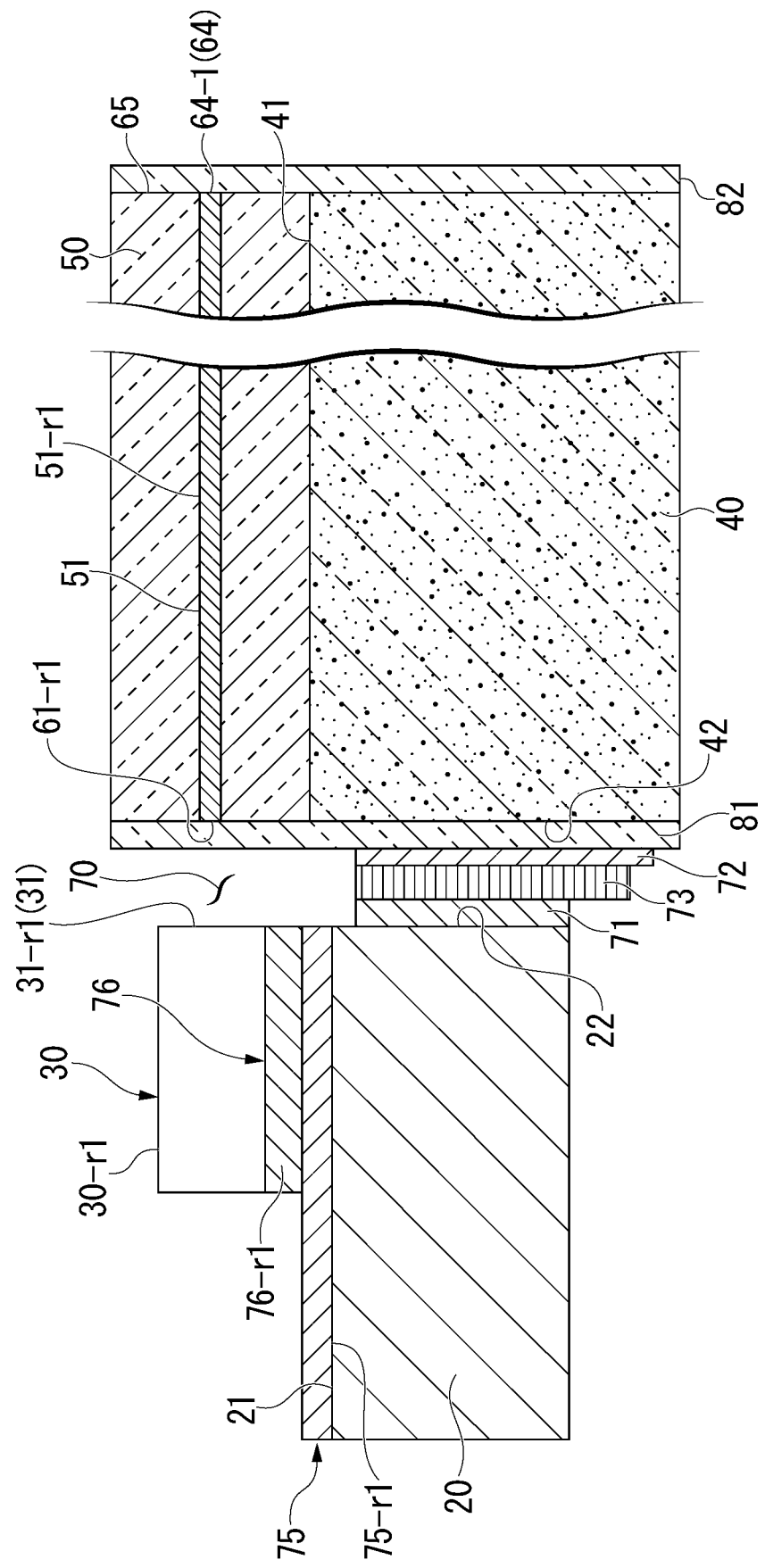
FIG. 3 is a schematic cross-sectional view of the integrated light source module shown in FIG. 1 cut along the A-A' line.
Figure 4:
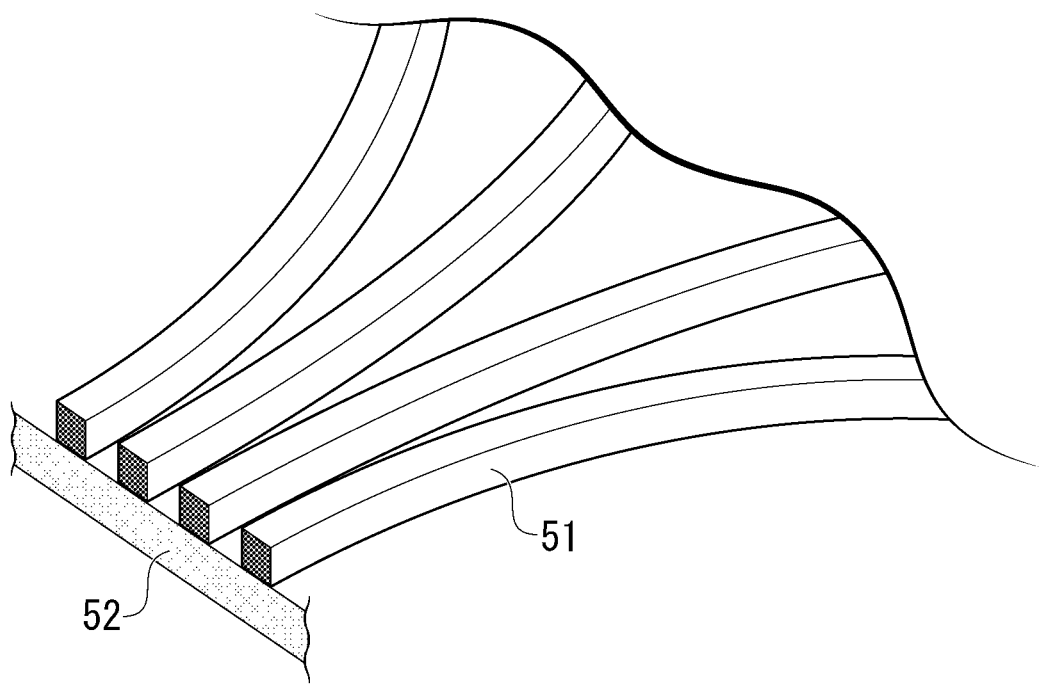
FIG. 4 is a perspective view conceptually showing the vicinity of the exit surface of the configuration in which light exit ports of a PLC are densified.

FIG. 1 is a schematic perspective view of an integrated light source module according to an embodiment. FIG. 2 is a front schematic view of a part of the incident surface on which light incident ports of a planar optical waveguides layer of the integrated light source module shown in FIG. 1 is arranged, as viewed from the front. FIG. 3 is a schematic cross-sectional view of the integrated light source module 100 shown in FIG. 1 cut along the A-A' line. FIG. 4 is a perspective view conceptually showing the vicinity of the exit surface of the configuration in which light exit ports of a PLC is densified. In FIG. 4, only a part of the core 51 and the cladding 52 below the core is drawn. In the integrated light source module, a light source that generates light having a specific frequency may be used, or a light source that generates light other than visible light may be used.

The integrated light source module 100 shown in FIG. 1 has a planar optical waveguides layer 50 including N light incident ports 61 aligned with respect to each other, M light exit ports 64 aligned with respect to each other, and optical waveguides connected to the N light incident ports and the M light exit ports and N optical semiconductor devices 30 facing each of the N light incident ports 61 arranged so that light emitted from each of the N optical semiconductor devices 30 can be incident on each of the N light incident ports 61, wherein light emitted from the M light exit ports 64 can be applied to an object to be irradiated.

Here, the "planar optical waveguides" is a component corresponding to a planar lightwave circuit (PLC), but is often referred to as a "planar optical waveguides" in the present specification. Since the "planar optical waveguides" includes claddings and cores, and is usually a thin layer, it may be referred to as a "planar optical waveguides layer". Further, as the "optical semiconductor device", a laser diode (LD) and a light emitting diode (Light Emitting Diode: LED) can be exemplified, but the LD will be described below as an example.

The integrated light source module 100 shown in FIG. 1 further includes a subcarrier (base) 20 having LDs 30 on the upper surface (surface) 21 (see, FIG. 3) and a substrate 40 having a PLC 50 on the upper surface (surface) 41 (see, FIG. 3). In addition, in FIG. 1, some of the components shown in FIGS. 2 and 3 are omitted.

The integrated light source module according to the present embodiment uses a planar lightwave circuit (PLC) and has a configuration in which the output of each semiconductor laser chips reaches the light exit ports (exit ends)

of the PLC. By designing the PLC such that some optical waveguides have curved paths and arranging light beams at a high density at the light exit ports (exit ends) (see, FIG. 4), the light output can be increased in density.

The integrated light source module according to the present disclosure can obtain the same effect as condensing light by combining optical semiconductor devices with a PLC and narrowing the distance between the light exit ports of the PLC, and as a result, a lens is indispensable. Since there is no lens, the arrangement configuration of the light exit ports of the PLC can be freely taken. However, when it is desired to further make the light flux thinner emitted from the light exit ports of the PLC, a lens may be provided in front of the light exit ports.

Further, in the integrated light source module according to the present embodiment, the number of light incident ports (N) and the number of light exit ports (M) of the PLC can be designed by multiplexing and/or demultiplexing the optical waveguides based on PLC design.

Further, the integrated light source module according to the present embodiment can have a configuration in which a plurality of PLCs are stacked, and even in a case of using the same PLCs, the positions of the light exit ports in different PLCs can be shifted each other to increase the light output.

Further, the integrated light source module according to the present embodiment can be used as a printhead by arranging the light exit ports of the PLC one-dimensionally in an array. Further, by arranging the light exit ports of the PLC two-dimensionally in a matrix, it can be used as a light source of a display.

Further, the integrated light source module according to the present embodiment can emit light in a direction different from the optical axis of the optical semiconductor device based on PLC design. Therefore, the degree of freedom of the arrangement of the integrated light source module and the object to be irradiated (for example, a photosensitive drum) is increased.

The integrated light source module 100 includes N LDs 30 provided on the upper surface 21 of the subcarrier 20. The integrated light source module 100 has N LDs 30, for example, rn LDs that emit red light, gn LDs that emit green light, and bn LDs that emit blue light (rn+gn+bn=N), in which a set of LD30-$r1$ that emits red light, LD30-$g1$ that emits green light, and LD30-$b1$ that emits blue light is repeated in order. The LDs are spaced apart from each other in the x direction. In the integrated light source module 100, N LDs 30 are arranged one-dimensionally in an array, and the LD that emits red light, the LD that emits green light, and the LD that emits blue light are repeated in this order. The arrangement configuration of is not limited to this.

Here, the y direction is the emission direction of light emitted from the LD 30, that is, the direction along the optical axis. The x direction is a direction substantially orthogonal to the y direction. The z direction is orthogonal to the x direction and the y direction and is a direction from the subcarrier 20 toward the LD30.

In the present embodiment, among the three primary colors of light shown as examples, as red light, light having a peak wavelength of, for example, 610 nm or more and 750 nm or less can be used, as green light, light having a peak wavelength of, for example, 500 nm or more and 560 nm or less can be used, and as blue light, light having a peak wavelength of, for example, 435 nm or more and 480 nm or less can be used.

Light other than red (R), green (G) and blue (B) shown in the present embodiment can also be used, for example, near infrared light having a wavelength of 780 nm to 2.0 μm, mid-infrared light having a wavelength of 2.0 μm to 4 μm, far infrared light having a wavelength of 4.0 μm to 1.0 mm, near ultraviolet light having a wavelength of 200 nm to 380 nm, and far ultraviolet light having a wavelength of 10 nm to 200 nm. The mounting order of red (R), green (G), and blue (B) described with reference to the drawings does not need to be in this order and can be changed as appropriate.

The integrated light source module 100 is configured to include all N LD30$s$ on one subcarrier 20. In such a configuration, by setting the interval between the LDs 30 to, for example, about 10 μm or more and 1000 μm or less, N LD30$s$ can be arranged at high density. By arranging the LDs 30 at high density, the N light incident ports in the PLC 50 can be arranged at high density.

Not limited to this configuration, for example, it may be configured to be provided in a different subcarrier for LDs of each light of the three primary colors of red (R), green (G) and blue (B), or it may be configured to have the same number of subcarriers as N LDs.

The LDs 30 are mounted on the subcarrier 20 as a bare chip (an unpackaged chip). The subcarrier 20 is constituted of, for example, aluminum nitride (AlN), aluminum oxide ($Al_2O_3$), silicon (Si), or the like. As illustrated in FIG. 3, a first metal layer (a metal layer) 75 and a second metal layer 76 are provided between the subcarrier 20 and the LDs 30. The LDs 30 are connected to the subcarrier 20 via the first metal layer 75 in contact with the subcarrier 20 and the second metal layer 76 in contact with the LDs 30. In the present embodiment, for example, the subcarrier 20 and the LD30-$r1$ are connected to each other in the z direction via the first metal layer 75-$r1$ and the second metal layer 76-$r1$.

A known method can be used as the method for forming the first metal layer 75 and the second metal layer 76. Although not particularly limited, but a known method such as sputtering, vapor deposition, or application of a pasted metal can be used. The first metal layer 75 can be, for example, composed of any alloy selected from the group consisting of an alloy of gold (Au) and tin (Sn), an alloy of tin (Sn) and copper (Cu), an alloy of indium (In) and bismuth (Bi), and tin (Sn)-silver (Ag)-copper (Cu)-based solder alloys (SACs). The second metal layer 76 can be, for example, composed of one or more metals selected from the group consisting of gold (Au), platinum (Pt), silver (Ag), lead (Pb), indium (In) and nickel (Ni). As described above, the first metal layer 75 can be made of an alloy and the second metal layer 76 can be made of a single metal.

The substrate 40 is formed of silicon (Si). The PLC 50 is manufactured integrally with the substrate 40 on the top surface 41 of the substrate 40 by a known semiconductor process including photolithography or dry etching used to form fine structures such as integrated circuits. As illustrated in FIG. 1 and FIG. 2, the PLC 50 has the same number of cores 51 (51-$r1$, 51-$g1$, 51-$b1$, ...) as N LDs 30 (30-$r1$, 30-$g1$, 30-$b1$, ...) and a cladding 52 surrounding them. The thickness of the cladding 52 and the width direction dimension of each core are not particularly limited. For example, the cores 51 having a width direction dimension of about several microns are arranged in the cladding 52 having a thickness of approximately 50 μm.

The cores 51 and the cladding 52 are made of quartz, for example. The refractive index of the cores 51 is higher than the refractive index of the cladding 52 by a predetermined value. As a result, the light that reaches each of the cores 51 propagates through each core while being totally reflected at the interface between each core and the cladding 52. The cores 51 are doped with an impurity such as germanium (Ge) in an amount corresponding to the predetermined value described above.

As shown in FIGS. 1 and 3, each of the N light incident ports 61 (61-r1, 61-g1, 61-b1, . . . 61-rn, 61-gn, 61-bn) in the PLC 50 are arranged so as to face each of the light exit ports 31 of the LDs 30 along the optical axis.

Here, in the present specification, the "light incident port" in the PLC 50 means an end surface (exposed surface) in which each core 51 is exposed to the incident surface 62, as shown in FIG. 2. As the light incident ports 61 in the PLC 50, N light incident ports 61 (61-r1, 61-g1, 61-b1, . . . 61-rn, 61-gn, 61-bn) are arranged on the incident surface 62, corresponding to N LDs 30 (30-r1, 30-g1, 30-b1, . . . 30-rn, 30-gn, 30-bn).

In the integrated light source module 100, in the y-direction, the optical axis of the red light emitted from the light exit port 31-r1 of the LD3041 and the center of the light incident port 61-r1 substantially overlap. The light exit port of LD30-g1 faces the light incident port 61-g1 of the core 51-g1. In the y-direction, the optical axis of the green light emitted from the light exit port of the LD30-g1 and the center of the light incident port 61-g1 substantially overlap. The light exit port of LD30-g1 faces the light incident port 61-g1 of the core 51-g1. In the y-direction, the optical axis of the blue light emitted from the light exit port of the LD30-b1 and the center of the light incident port 61-b1 substantially overlap. The light exit port of LD30-b1 faces the light incident port 61-b1 of the core 51-b1. With such a configuration and an arrangement, at least some of the red light, green light, and blue light emitted from the LD30-r1, LD 30-g1, and LD 30-b1 can be incident on the cores 51-r1, 51-g1, and 51-b1.

The red light, green light, and blue light emitted from the N LDs 30 are incident on the light incident ports 61 of the N cores 51 and then propagate through each core. Each of the N cores 51 reaches the M light exit ports 64 arranged on the exit surface 65 while multiplexing and/or demultiplexing.

Here, in the present specification, the "light exit port" in the PLC 50 means an end surface (exposed surface) in which each core 51 is exposed to the exit surface 65. As the light exit ports in the PLC 50, M light exit ports 64 (64-1, 64-2, . . . 64-M) are arranged on the exit surface 65 according to the multiplexing/demultiplexing of each core 51.

As shown in FIG. 3, the subcarrier 20 is connected to the substrate 40 via a third metal layer 71, a fourth metal layer 72, and a fifth metal layer 73. In the present embodiment, the surface 22 facing the substrate 40 in the subcarrier 20 and the surface 42 facing the subcarrier 20 in the substrate 40 are connected via the third metal layer 71, the fourth metal layer 72, the fifth metal layer 73, and an antireflection film 81. The melting point of the first metal layer 75 is higher than the melting point of the fifth metal layer 73.

The third metal layer 71 is provided in a state of being in contact with the surface 22 by sputtering, vapor deposition, or the like, and is composed of, for example, one or more metals selected from the group consisting of gold (Au), platinum (Pt), silver (Ag), lead (Pb), indium (In), nickel (Ni), titanium (Ti) and tantalum (Ta). Further, the third metal layer 71 is preferably composed of any metal selected from the group consisting of gold (Au), platinum (Pt), silver (Ag), lead (Pb), indium (In) and nickel (Ni). The fourth metal layer 72 is provided in a state of being in contact with the surface 42 by sputtering, vapor deposition, or the like, and is composed of, for example, one or more metals selected from the group consisting of titanium (Ti), tantalum (Ta), and tungsten (W). Further, the fourth metal layer 72 is preferably composed of tantalum (Ta). The fifth metal layer 73 is interposed between the third metal layer 71 and the fourth metal layer 72, and is composed of, for example, one or more alloys selected from the group consisting of AuSn, SnCu, InBi, SnAgCu, SnPdAg, SnBiIn and PbBiIn. Further, the fifth metal layer 73 is preferably composed of any alloy selected from the group consisting of AuSn, SnAgCu and SnBiIn. As described above, the third metal layer 71 and the fourth metal layer 72 can be made of a single metal, the fifth metal layer 73 can be made of an alloy. The subcarrier 20 and the substrate 40 can be joined via a single metal and an alloy.

Further, in the present embodiment, the antireflection film 81 is provided between the LDs 30 and the PLC 50. For example, the antireflection film 81 is integrally formed with the side surface 42 of the substrate 40 and the incident surface 62 provided with the light incident ports 61 of the PLC 50. However, the antireflection film 81 may be formed only on the incident surface 62 provided with the light incident ports 61 of the PLC 50.

Further, in addition to the incident surface 62 provided with the light incident ports 61, the antireflection film 82 is also provided on the exit surface 65 provided with the light exit ports 64. Note that, FIG. 1 shows a schematic configuration of the integrated light source module 100, and the third metal layer 71, the fourth metal layer 72, the fifth metal layer 73, and the antireflection films 81 and 82 are omitted.

The antireflection films 81 and 82 prevent the light incident on the PLC 50 or the emitted light from the PLC 50 from being reflected from the light incident ports 61 or the light exit ports 64 in the direction opposite to the direction of entering each surface, and are films for increasing the transmittance of the incident light or the emitted light. The antireflection films 81 and 82 are multilayer films formed by, for example, layers of a plurality of types of dielectric being alternately laminated with a predetermined thickness depending on the wavelengths of incident light such as red light, green light, and blue light. Examples of the above-mentioned dielectric include titanium oxide ($TiO_2$), silicon oxide ($SiO_2$), aluminum oxide ($Al_2O_3$) and the like.

The light exit ports 31 of the LDs 30 and the light incident ports 61 of the PLC 50 are arranged at a predetermined interval. The light incident ports 61 face the light exit ports 31, and there is a gap 70 between the light exit ports 31 and the light incident ports 61 in the y direction. Since the integrated light source module 100 is exposed to the air, the gap 70 is filled with air. Considering the amount of light used in the integrated light source module 100 and the like, the size of the gap 70 in the y direction (the size of the interval between the light exit ports 31 and the light incident ports 61) is preferably, for example, larger than 0 μm and 5 μm or less.

Planar Optical Waveguides (First Embodiment)

FIG. 5A is a plan view conceptually showing an integrated light source module 101 including a PLC 150 having the same (N=M) configuration as the number of incident ports (N) and the number of exit ports (M). FIG. 5B is a front view of the PLC 150 of the integrated light source module 101 shown in FIG. 5A as seen from the incident surface 162 side provided with the light incident ports 161. FIG. 5C is a front view of the PLC 150 of the integrated light source module 101 shown in FIG. 5A as seen from the exit surface 165 side provided with the light exit ports 164. In FIG. 5A, components other than PLC 150 and LDs 130 are omitted.

The PLC 150 shown in FIG. 5A has a configuration in which the input end and the output end of the planar optical waveguides have a one-to-one correspondence. Since the input/output is determined on a one-to-one basis, the shapes of the optical waveguides can be simplified and the loss from the input to the output is small.

The integrated light source module 101 shown in FIG. 5A has a PLC 150 including N light incident ports 161 (161-1, 161-2, 161-3, . . . , 161-(N−1), 161-N) aligned with respect to each other in an array (one-dimensionally), M light exit ports 164 (164-1, 164-2, 164-3, . . . , 164-(N−1), 164-N) aligned with respect to each other in an array and optical waveguides 151 (151-1, 151-2, 151-3, . . . , 151-(N−1), 151-N) connected to the N light incident ports 161 and the M light exit ports 164, and N optical semiconductor devices 130 (130-1, 130-2, 130-3, . . . , 130-(N−1), 130-N) facing each of the N light incident ports 161 aligned with respect to each other in an array so that light emitted from each of the N optical semiconductor devices 130 can be incident on each of the N light incident ports 161.

In the PLC 150 shown in FIG. 5A, the configuration is such that the intervals (distances) $d_{i1}$ between adjacent light incident ports of N light incident ports are the same. Some of intervals may be different, or all intervals may be different. The intervals $d_{i1}$ are not particularly limited, but can be, for example, 10 μm or more and 1000 μm or less.

In the PLC 150 shown in FIG. 5A, the configuration is such that the intervals (distances) $d_{O1}$ between adjacent light exit ports of M light exit ports are the same. Some of intervals may be different, or all intervals may be different. The intervals $d_{O1}$ are not particularly limited, but can be, for example, 10 μm or more and 1000 μm or less.

In the PLC 150 shown in FIG. 5A, the configuration is such that the interval $d_{i1}$ between adjacent light incident ports of N light incident ports and the interval $d_{O1}$ between adjacent light exit ports of M light exit ports are the same. The interval $d_{i1}$ and the interval $d_{O1}$ may be different. Some of the intervals in one or both of the interval $d_{i1}$ between adjacent light incident ports and the interval $d_{O1}$ between adjacent light exit ports may be different. All of the intervals in one or both of the interval $d_{i1}$ between adjacent light incident ports and the interval $d_{O1}$ between adjacent light exit ports may be different.

In the PLC 150 shown in FIG. 5A, the configuration is such that N light incident ports are aligned in an array (one-dimensionally), corresponding to the arrangement of N LDs 130. N light incident ports may be aligned in a two-dimensional manner such as a matrix.

In the PLC 150 shown in FIG. 5A, the configuration is such that M light exit ports are aligned in an array (one-dimensionally). M light exit ports may be aligned in a two-dimensional manner such as a matrix.

The configuration may be such that N light incident ports are aligned in an array (one-dimensionally) and M light exit ports are aligned two-dimensionally, in a matrix shape or the like. And vice versa, the configuration may be such that N light incident ports are aligned in a two-dimensional manner such as a matrix and M light exit ports may be aligned in an array (one-dimensionally).

In the N LDs 130 shown in FIG. 5A, all LDs may have the same frequency, some LDs may have different frequencies, or all LDs may have different frequencies.

In the N LDs 130 shown in FIG. 5A, all LDs may have the same output, some LDs may have different outputs, or all LDs may have different outputs.

In the N LDs 130 shown in FIG. 5A, the light exit ports of all LDs are substantially aligned on the same surface (on the same position in the y direction), but the light exit ports of some LDs may be in different positions in the y direction, and the light exit ports of all LDs may be located at different positions in the y direction.

The N LDs 130 shown in FIG. 5A are arranged in an array (one-dimensionally), but may be arranged in a two-dimensional manner such as a matrix.

Planar Optical Waveguides (Second Embodiment)

FIG. 6A is a plan view conceptually showing an integrated light source module 102 including a PLC 250 having a configuration in which the number of light incident ports (N) and the number of light exit ports (M) are different and the number of light exit ports is smaller than the number of light incident ports (N>M). FIG. 6B is a front view of the PLC 250 of the integrated light source module 102 shown in FIG. 6A as seen from the incident surface 262 side provided with the light incident ports 261. FIG. 6C is a front view of the PLC 250 of the integrated light source module 102 shown in FIG. 6A as seen from the exit surface 265 side provided with the light exit ports 264. In FIG. 6, components other than PLC 250 and LDs 230 are omitted.

The PLC 250 shown in FIG. 6A has a configuration in which a configuration in which the number of the output ends is smaller than the number of the inputs end, for example, when the output from one optical semiconductor device is weak, the output can be increased by multiplexing a plurality of optical waveguides. Further, it is possible to obtain different frequencies by multiplexing the light emitted from the optical semiconductor devices having the same frequency in the planar optical waveguides, or to obtain the output of a specific frequency by multiplexing the optical semiconductor devices having different frequencies.

The integrated light source module 102 shown in FIG. 6A has a PLC 250 including N light incident ports 261 (261-1, 261-2, 261-3, . . . , 261-(N−1), 261-N) aligned with respect to each other in an array (one-dimensionally), M light exit ports 264 (264-1, 264-2, 264-3, . . . , 264-(N−1), 264-N) aligned with respect to each other in an array and optical waveguides 251 (251-1, 251-2, 251-3, . . . , 251-(N−1), 251-N) and optical waveguides 252 (252-1, 252-2, 252-3, . . . , 252-(M−1), 252-M) connected to the N light incident ports 261 and the M light exit ports 264, and N optical semiconductor devices 230 (230-1, 230-2, 230-3, . . . , 230-(N−1), 230-N) facing each of the N light incident ports 261 aligned with respect to each other in an array so that light emitted from each of the N optical semiconductor devices 230 can be incident on each of the N light incident ports 261. Here, the N optical waveguides 251 are integrated into M (N>M) optical waveguides 252 by multiplexing some of the N optical waveguides 251 in the PLC 250.

The PLC 250 shown in FIG. 6A has a configuration in which the optical waveguide 251-1 and the optical waveguide 251-2 are combined at the multiplexing position g1 to form the optical waveguide 252-1. With this configuration, the laser beam emitted from the LD230-1, incident on the light incident port 261-1 of the optical waveguide 251-1 and propagated through the optical waveguide 251-1, and the laser beam emitted from the LD230-2, incident on the light incident port 261-2 of the optical waveguide 251-2, and propagated through the optical waveguide 251-2 combines at the multiplexing position g1. The combined laser beam propagates through the optical waveguide 252-1 and emits from the light exit port 264-1.

Further, the optical waveguide 251-(N−1) and the optical waveguide 251-N are configured to be combined at the multiplexing position gm to form the optical waveguide 252-M. With this configuration, the laser beam emitted from the LD230-(N−1), incident on the light incident port 261-(N−1) of the optical waveguide 251-(N−1) and propagated through the optical waveguide 251-(N−1), and the laser beam emitted from the LD230-N, incident on the light incident port 261-N of the optical waveguide 251-N, and propagated through the optical waveguide 251-N combines at the multiplexing position gm. The combined laser beam propagates through the optical waveguide 252-M, and emits from the light exit port 264-M.

The PLC 250 shown in FIG. 6A has a configuration in which the optical waveguide multiplexing at the multiplexing position g1, the optical waveguide multiplexing at the multiplexing position (not shown), and the optical waveguide multiplexing at the multiplexing position gM are connected to the light exit ports, respectively, without multiplexing thereafter. The PLC 250 shown in FIG. 6A may have a configuration in which the optical waveguides further combines once or more than once at a predetermined multiplexing position behind those multiplexing positions in the y direction.

The PLC 250 shown in FIG. 6A may have a configuration in which all optical waveguides combine at least once between the incident surface and the exit surface. The PLC 250 shown in FIG. 6A may have a configuration in which an optical waveguide that never combine with another optical waveguide exists (that is, a configuration in which optical waveguides that combine and optical waveguides that do not combine coexist).

In the PLC 250 shown in FIG. 6A, the configuration is such that the intervals (distances) $d_{i2}$ between adjacent light incident ports of N light incident ports are the same. Some of intervals may be different, or all intervals may be different, similar to the PLC 150 shown in FIG. 5A.

In the 250 shown in FIG. 6A, the configuration is such that the intervals (distances) $d_{O2}$ between adjacent light exit ports of M light exit ports are the same. Some of intervals may be different, or all intervals may be different, similar to the PLC 150 shown in FIG. 5A.

In the PLC 250 shown in FIG. 6A, the configuration is such that N light incident ports are aligned in an array (one-dimensionally), corresponding to the arrangement of N LDs 230. N light incident ports may be aligned in a two-dimensional manner such as a matrix, similar to the PLC 150 shown in FIG. 5A.

In the PLC 250 shown in FIG. 6A, the configuration is such that M light exit ports are aligned in an array (one-dimensionally). M light exit ports may be aligned in a two-dimensional manner such as a matrix, similar to the PLC 150 shown in FIG. 5A.

The configuration may be such that N light incident ports are aligned in an array (one-dimensionally) and M light exit ports are aligned in a two-dimensional manner such as a matrix. And vice versa, the configuration may be such that N light incident ports are aligned in a two-dimensional manner such as a matrix and M light exit ports may be aligned in an array (one-dimensionally), similar to the PLC 150 shown in FIG. 5A.

In the N LDs 230 shown in FIG. 6A, all LDs may have the same frequency, some LDs may have different frequencies, or all LDs may have different frequencies, similar to the PLC 150 shown in FIG. 5A.

In the N LDs 230 shown in FIG. 6A, all LDs may have the same output, some LDs may have different outputs, or all LDs may have different outputs, similar to the PLC 150 shown in FIG. 5A.

In the N LDs 230 shown in FIG. 6A, the light exit ports of all LDs are substantially aligned on the same surface (on the same position in the y direction), but the light exit ports of some LDs may be in different positions in the y direction, and the light exit ports of all LDs may be located at different positions in the y direction, similar to the PLC 150 shown in FIG. 5A.

The N LDs 230 shown in FIG. 6A are arranged in an array (one-dimensionally), but may be arranged in a two-dimensional manner such as a matrix, similar to the PLC 150 shown in FIG. 5A.

Planar Optical Waveguides (Third Embodiment)

FIG. 7A is a plan view conceptually showing an integrated light source module 103 including a PLC 350 having a configuration in which the number of light incident ports (N) and the number of light exit ports (M) are different and the number of light incident ports is smaller than the number of light exit ports (N<M). FIG. 7B is a front view of the PLC 350 of the integrated light source module 103 shown in FIG. 7A as seen from the incident surface 362 side provided with the light incident ports 361. FIG. 7C is a front view of the PLC 350 of the integrated light source module 103 shown in FIG. 7A as seen from the exit surface 365 side provided with the light exit ports 364. In FIG. 7A, components other than PLC 350 and LDs 330 are omitted.

The PLC 350 shown in FIG. 7A has a configuration in which a configuration in which the number of the output ends is larger than the number of the inputs end. For example, with respect to the output of one optical semiconductor device, the output can be divided by demultiplexing the optical waveguide, and as a result, the density of the output end can be improved. Further, with respect to the output of one optical semiconductor device, it is possible to obtain output ends having different characteristics (frequency characteristics) at high density by dividing the optical waveguide having a certain frequency in the PLC.

The integrated light source module 103 shown in FIG. 7A has a PLC 250 including N light incident ports 361 (361-1, 361-2, 361-3, . . . , 361-(N−1), 361-N) aligned with respect to each other in an array (one-dimensionally), M light exit ports 364 (364-1, 364-2, 364-3, . . . , 364-(N−1), 364-N) aligned with respect to each other in an array and optical waveguides 351 (351-1, 351-2, 351-3, . . . , 351-(N−1), 351-N) and optical waveguides 352 (352-1a, 352-1b, 352-2a, 352-2b, 352-3a, 352-3b, . . . , 352-(N−1)a, 352-(N−1)b) connected to the N light incident ports 361 and the M light exit ports 364, and N optical semiconductor devices 330 (330-1, 330-2, 330-3, . . . , 330-(N−1), 330-N) facing each of the N light incident ports 361 aligned with respect to each other in an array so that light emitted from each of the N optical semiconductor devices 330 can be incident on each of the N light incident ports 361.

The PLC 350 shown in FIG. 7A has a configuration in which the optical waveguide 351-1 is branched at the demultiplexing position b1 to form the optical waveguide 351-1a and the optical waveguide 351-1b. With this configuration, the laser beam emitted from the LD 330-1, incident on the light incident port 361-1 of the optical waveguide 351-1 and propagated through the optical waveguide 351-1 branches at the demultiplexing at the demultiplexing position b1. One of the branched laser beams propagates through the optical waveguide 351-1a, and emits from the light exit port 364-1. The other of the branched laser beams propagates through the optical waveguide 351-1b, and emits from the light exit port 364-2.

Similarly, the PLC 350 shown in FIG. 7A has a configuration in which the optical waveguide 351-2 is branched at the demultiplexing position b2 to form the optical waveguide 351-2*a* and the optical waveguide 351-2*b*. With this configuration, the laser beam emitted from the LD 330-2, incident on the light incident port 361-2 of the optical waveguide 351-2 and propagated through the optical waveguide 351-2 branches at the demultiplexing at the demultiplexing position b2. One of the branched laser beams propagates through the optical waveguide 351-2*a*, and emits from the light exit port 364-3. The other of the branched laser beams propagates through the optical waveguide 351-2*b*, and emits from the light exit port 364-4.

Similarly, the PLC 350 shown in FIG. 7A has a configuration in which the optical waveguide 351-2 is branched at the demultiplexing position b3 to form the optical waveguide 351-3*a* and the optical waveguide 351-3*b*. With this configuration, the laser beam emitted from the LD 330-2, incident on the light incident port 361-3 of the optical waveguide 351-3 and propagated through the optical waveguide 351-3 branches at the demultiplexing at the demultiplexing position b3. One of the branched laser beams propagates through the optical waveguide 351-3*a*, and emits from the light exit port 364-5. The other of the branched laser beams propagates through the optical waveguide 351-3*b*, and emits from the light exit port 364-6.

Similarly, the PLC 350 shown in FIG. 7A has a configuration in which the optical waveguide 351-(N−1) is branched at the demultiplexing position b(N−1) to form the optical waveguide 351-(N−1) a and the optical waveguide 351-(N−1) b. With this configuration, the laser beam emitted from the LD 330-(N−1), incident on the light incident port 361-(N−1) of the optical waveguide 351-(N−1) and propagated through the optical waveguide 351-(N−1) branches at the demultiplexing at the demultiplexing position b(N−1). One of the branched laser beams propagates through the optical waveguide 351-(N−1)a, and emits from the light exit port 364-(M−2). The other of the branched laser beams propagates through the optical waveguide 351-(N−1)b, and emits from the light exit port 364-(M−1).

In the PLC 350 shown in FIG. 7A, the optical waveguide 351-N does not branch and is connected to the exit port 364-M.

The PLC 350 shown in FIG. 7A may have a configuration in which all optical waveguides consist only of optical waveguides that branch at least once between the incident surface and the exit surface. The PLC 350 shown in FIG. 7A may have a configuration in which an optical waveguide that never branch exists (that is, a configuration in which optical waveguides that branch and optical waveguides that do not branch coexist).

The PLC 350 shown in FIG. 7A have a configuration in which the optical waveguide demultiplexing at the demultiplexing position b1, the optical waveguide demultiplexing at the demultiplexing position (not shown), and the optical waveguide demultiplexing at the demultiplexing position b(N−1) are connected to the light exit ports, respectively, without demultiplexing thereafter. The PLC 350 shown in FIG. 7A may have a configuration in which the optical waveguides further branches once or more than once at a predetermined demultiplexing position behind those demultiplexing positions in the y direction.

The PLC 350 shown in FIG. 7A has a configuration in which the intervals (distances) $d_{i3}$ between adjacent light incident ports of N light incident ports are the same. Some of intervals may be different, or all intervals may be different, similar to the PLC 150 shown in FIG. 5A and the PLC 250 shown in FIG. 6A.

The PLC 350 shown in FIG. 7A may have a configuration in which the intervals (distances) $d_{O3}$ between adjacent light exit ports of M light exit ports are the same. Some of intervals may be different, or all intervals may be different, similar to the PLC 150 shown in FIG. 5A and the PLC 250 shown in FIG. 6A.

The PLC 350 shown in FIG. 7A has a configuration in which N light incident ports are aligned in an array (one-dimensionally), corresponding to the arrangement of N LDs 330. N light incident ports may be aligned in a two-dimensional manner such as a matrix, similar to the PLC 150 shown in FIG. 5A and the PLC 250 shown in FIG. 6A.

The PLC 350 shown in FIG. 7A has a configuration in which M light exit ports are aligned in an array (one-dimensionally). M light exit ports may be aligned in a two-dimensional manner such as a matrix, similar to the PLC 150 shown in FIG. 5A and the PLC 250 shown in FIG. 6A.

The PLC 350 shown in FIG. 7A may have a configuration in which N light incident ports are aligned in an array (one-dimensionally) and M light exit ports are aligned in a two-dimensional manner such as a matrix. And vice versa, the PLC 350 shown in FIG. 7A may have a configuration in which N light incident ports are aligned in a two-dimensional manner such as a matrix and M light exit ports may be aligned in an array (one-dimensionally), similar to the PLC 150 shown in FIG. 5A and the PLC 250 shown in FIG. 6A.

In the N LDs 330 shown in FIG. 7A, all LDs may have the same frequency, some LDs may have different frequencies, or all LDs may have different frequencies, similar to the PLC 150 shown in FIG. 5A and the PLC 250 shown in FIG. 6A.

In the N LDs 330 shown in FIG. 7A, all LDs may have the same output, some LDs may have different outputs, or all LDs may have different outputs, similar to the PLC 150 shown in FIG. 5A and the PLC 250 shown in FIG. 6A.

In the N LDs 330 shown in FIG. 7A, the light exit ports of all LDs are substantially aligned on the same surface (on the same position in the y direction), but the light exit ports of some LDs may be in different positions in the y direction, and the light exit ports of all LDs may be located at different positions in the y direction, similar to the PLC 150 shown in FIG. 5A and the PLC 250 shown in FIG. 6A.

The N LDs 330 shown in FIG. 7A are arranged in an array (one-dimensionally). The N LDs 330 shown in FIG. 7 may be arranged in a two-dimensional manner such as a matrix, similar to the PLC 150 shown in FIG. 5A and the PLC 250 shown in FIG. 6A.

Planar Optical Waveguides (Fourth Embodiment)

FIG. 8A is a plan view conceptually showing an integrated light source module 104 including a PLC 450 having a configuration in which the first to third embodiments of the planar optical waveguides are combined. FIG. 8B is a front view of the PLC 450 of the integrated light source module 104 shown in FIG. 8A as seen from the incident surface 462 side provided with the light incident ports 461. FIG. 8C is a front view of the PLC 450 of the integrated light source module 104 shown in FIG. 8A as seen from the exit surface 465 side provided with the light exit ports 464. In FIG. 8A, components other than PLC 450 and LDs 430 are omitted.

By designing the optical waveguides in the plane optical waveguides, it is possible to configure a light source integrated module that emits light of a desired output or frequency from the outputs and frequencies of a plurality of optical semiconductor devices. According to this technique, since the integrated light source modules having different frequencies can be obtained without using optical semiconductor devices having different frequencies, the assembly efficiency and the production efficiency when constructing the light source modules are improved.

The integrated light source module 104 shown in FIG. 8A has a PLC 450 including N light incident ports 461 (461-1, 461-2, 461-3, . . . , 461-(N−1), 461-N) aligned with respect to each other in an array (one-dimensionally), M light exit ports 464 (464-1, 464-2, 464-3, . . . , 464-(M−2), 464-(M−1), 464-M) aligned with respect to each other in an array and optical waveguides 451 (451-1, 451-2, 451-3, . . . , 451-(N−1), 451-N) and optical waveguides 452 (452-1a, 452-1b, 452-2, . . . , 452-(N−1)a, 452-(N−1)b) connected to the N light incident ports 461 and the M light exit ports 464, and N optical semiconductor devices 430 (430-1, 430-2, 430-3, . . . , 430-(N−1), 430-N) facing each of the N light incident ports 461 aligned with respect to each other in an array so that light emitted from each of the N optical semiconductor devices 430 can be incident on each of the N light incident ports 461. Here, some of the N optical waveguides 451 are combined and/or branched to form M optical waveguides 452, reaching the M exit ports, in the PLC 450.

The PLC 450 shown in FIG. 8A has a configuration in which the optical waveguide 451-1 is branched at the demultiplexing position b1 to form the optical waveguide 451-1a and the optical waveguide 451-1b. With this configuration, the laser beam emitted from the LD 430-1, incident on the light incident port 461-1 of the optical waveguide 451-1 and propagated through the optical waveguide 451-1 branches at the demultiplexing at the demultiplexing position b1. One of the branched laser beams propagates through the optical waveguide 451-1a, and emits from the light exit port 464-1. The other of the branched laser beams propagates through the optical waveguide 451-1b, and emits from the light exit port 464-2.

Similarly, the PLC 450 shown in FIG. 8A has a configuration in which the optical waveguide 451-(N−1) is branched at the demultiplexing position bx to form the optical waveguide 451-(N−1)a and the optical waveguide 451-(N−1)b. With this configuration, the laser beam emitted from the LD 430-(N−1), incident on the light incident port 461-(N−1) of the optical waveguide 451-(N−1) and propagated through the optical waveguide 451-(N−1) branches at the demultiplexing at the demultiplexing position bx. One of the branched laser beams propagates through the optical waveguide 451-(N−1)a, and emits from the light exit port 464-(M−2). The other of the branched laser beams propagates through the optical waveguide 351-(N−1)b, and emits from the light exit port 464-(M−1).

The PLC 450 shown in FIG. 8A has a configuration in which the optical waveguide 451-2 and the optical waveguide 451-3 are combined at the multiplexing position g1 to form the optical waveguide 452-2. With this configuration, the laser beam emitted from the LD 430-2, incident on the light incident port 461-2 of the optical waveguide 451-2 and propagated through the optical waveguide 451-2, and the laser beam emitted from the LD 430-3 incident on the light incident port 461-3 of the optical waveguide 451-3, and propagated through the optical waveguide 451-3 combines at the multiplexing position g1. The combined laser beam propagates through the optical waveguide 452-2, and emits from the light exit port 464-3.

In the PLC 450 shown in FIG. 8A, the optical waveguide 451-N does not branch and is connected to the exit port 464-M.

The PLC 450 shown in FIG. 8A may have a configuration in which all optical waveguides consist only of optical waveguides that combine or branch at least once between the incident surface and the exit surface. The PLC 450 shown in FIG. 8A may have a configuration in which an optical waveguide that never combine or branch exists (that is, a configuration in which optical waveguides that combine or branch and optical waveguides that do not combine or branch coexist).

The PLC 450 shown in FIG. 8A has a configuration in which the optical waveguide demultiplexing at the demultiplexing position b1, the optical waveguide demultiplexing at the demultiplexing position bx, and the optical waveguide multiplexing at the multiplexing position g1 are connected to the light exit ports, respectively, without demultiplexing or multiplexing thereafter. The PLC 450 shown in FIG. 8A may have a configuration in which branch and/or combine once or more than once at a predetermined demultiplexing position behind those the demultiplexing positions and/or those multiplexing positions the in the y direction.

The PLC 450 shown in FIG. 8A has a configuration in which the intervals (distances) $d_{i4}$ between adjacent light incident ports of N light incident ports are the same. Some of intervals may be different, or all intervals may be different, similar to the PLC 150 shown in FIG. 5A, the PLC 250 shown in FIG. 6A and the PLC 350 shown in FIG. 7A.

The PLC 450 shown in FIG. 8A has a configuration in which N light incident ports are aligned in an array (one-dimensionally), corresponding to the arrangement of N LDs 430. N light incident ports may be aligned in a two-dimensional manner such as a matrix, similar to the PLC 150 shown in FIG. 5A, the PLC 250 shown in FIG. 6A and the PLC 350 shown in FIG. 7A.

The PLC 450 shown in FIG. 8A has a configuration in which M light exit ports are aligned in an array (one-dimensionally). M light exit ports may be aligned in a two-dimensional manner such as a matrix, similar to the PLC 150 shown in FIG. 5A, the PLC 250 shown in FIG. 6A and the PLC 350 shown in FIG. 7A.

The PLC 450 shown in FIG. 8A may have a configuration in which N light incident ports are aligned in an array (one-dimensionally) and M light exit ports are aligned in a two-dimensional manner such as a matrix. And vice versa, the PLC 450 shown in FIG. 8A may have a configuration in which N light incident ports are aligned in a two-dimensional manner such as a matrix and M light exit ports may be aligned in an array (one-dimensionally), similar to the PLC 150 shown in FIG. 5A, the PLC 250 shown in FIG. 6A and the PLC 350 shown in FIG. 7A.

In the LDs 430 shown in FIG. 8A, all LDs may have the same frequency, some LDs may have different frequencies, or all LDs may have different frequencies, similar to the PLC 150 shown in FIG. 5A, the PLC 250 shown in FIG. 6A and the PLC 350 shown in FIG. 7A.

In the N LDs 430 shown in FIG. 8A, all LDs may have the same output, some LDs may have different outputs, or all LDs may have different outputs, similar to the PLC 150 shown in FIG. 5A, the PLC 250 shown in FIG. 6A and the PLC 350 shown in FIG. 7A.

In the N LDs 430 shown in FIG. 8A, the light exit ports of all LDs are substantially aligned on the same surface (on the same position in the y direction), but the light exit ports of some LDs may be in different positions in the y direction, and the light exit ports of all LDs may be located at different positions in the y direction, similar to the PLC 150 shown in FIG. 5A, the PLC 250 shown in FIG. 6A and the PLC 350 shown in FIG. 7A.

The N LDs 430 shown in FIG. 8A are arranged in an array (one-dimensionally). The N LDs 430 shown in FIG. 8A may be arranged in a two-dimensional manner such as a matrix, similar to the PLC 150 shown in FIG. 5A, the PLC 250 shown in FIG. 6A and the PLC 350 shown in FIG. 7A.

Figure 9:
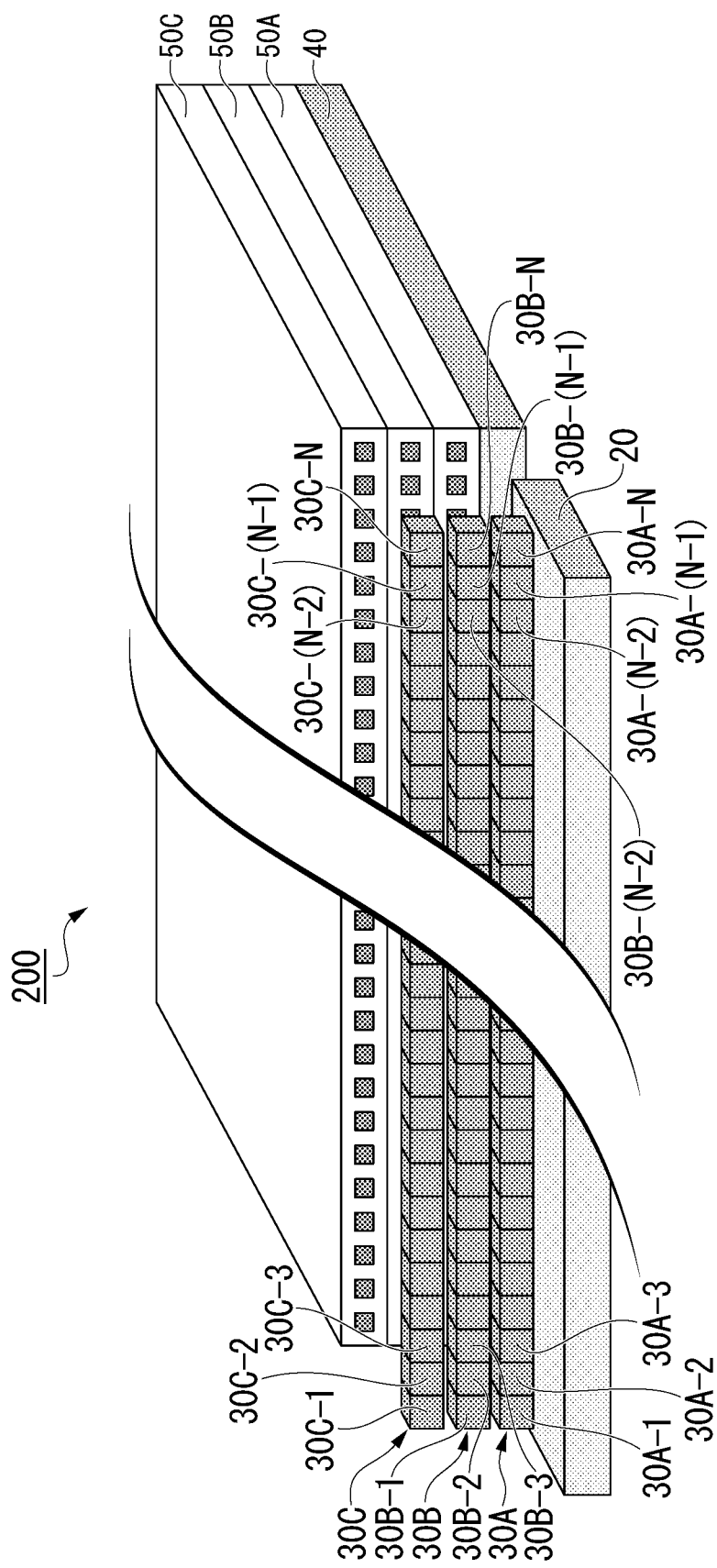
FIG. 9 is a schematic perspective view of an integrated light source module according to another embodiment.

FIG. 9 is a schematic perspective view of the integrated light source module 200 according to another embodiment.

The integrated light source module 200 shown in FIG. 9 has three layers of planar optical waveguides layers 50A, 50B, 50C including N light incident ports aligned with respect to each other, M light exit ports aligned with respect to each other, and optical waveguides connected to the N light incident ports and the M light exit ports and three layers of N optical semiconductor devices 30A, 30B, 30C.

In the integrated light source module 200 shown in FIG. 9, the subcarrier (base) 20 provided with 30A, 30B, 30C on the upper surface (surface) and the substrate 40 provided with PLC 50A, 50B, 50C on the upper surface (surface) are further shown, but the above-mentioned components are not shown.

The integrated light source module 200 of the present embodiment shown in FIG. 9 includes a three layers of planar optical waveguides (PLC) and three layers of N optical semiconductor devices (LD) corresponding to each planar optical waveguides layer. However, the configuration is not limited to three layers, and may be configured to include two layers or a plurality of layers of four or more layers.

It is preferable that reflective films 85A and 85B are provided between the planar optical waveguides (PLC) 50A and the planar optical waveguides (PLC) 50B, and between the planar optical waveguides (PLC) 50B and the planar optical waveguides (PLC) 50C, respectively.

This is because it is possible to suppress optical interference between the layers.

Metal films ca be used as the reflective films 85A and 85B. The metal films are preferably made of metal materials with high reflectance, for example, Ru, Ta, Ti, W and the like. When a metal film is used as the reflective films 85A and 85B, there is also an effect that the flatness can be easily maintained when the planar optical waveguides layer (PLC) is laminated.

Figure 10:
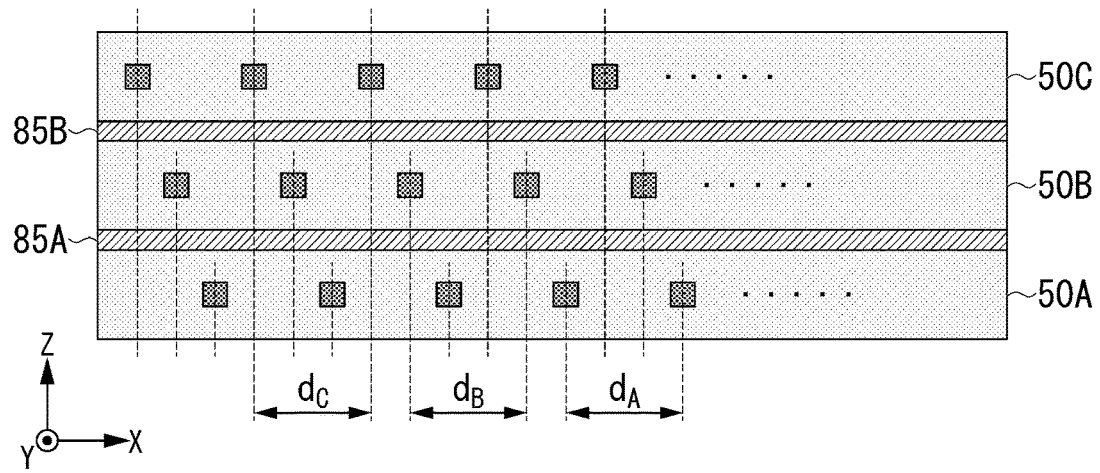
FIG. 10 is a front schematic view of the integrated light source module shown in FIG. 9 as viewed from the surface having light exit ports of a planar optical waveguides layer.

FIG. 10 is a front schematic view of the integrated light source module 200 shown in FIG. 9 as viewed from the surface having light exit ports of PLCs 50A, 50B, and 50C.

The integrated light source module 200 has a configuration in which the distances $d_A$, $d_B$, and dc of the adjacent light exit ports of the PLCs 50A, 50B, and 50C are all equal ($d_A=d_B=d_C=d$), and the position of the light exit port of the PLC 50B in the x direction is shifted by ⅓ of the interval d with respect to the position of the light exit port of the PLC 50A in the x direction, and the position of the light exit port of the PLC 50C in the x direction is shifted by ⅓ of the interval d with respect to the position of the light exit port of the PLC 50B in the same direction in the x direction. With this arrangement configuration, the density of the light exit port in the x direction of the PLC as a whole is tripled.

An example of a method for producing a laminated body in which a plurality of planar optical waveguides layers (PLCs) are laminated, which is provided in the integrated light source module as shown in FIGS. 9 and 10, will be described with reference to FIGS. 11A to 11H.

(1) Preparation of Substrate

Figure 11A:
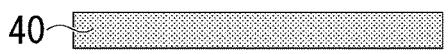
FIGS. 11A to 11H are cross-sectional schematic diagrams showing each process of the method of laminating a plurality of plane optical waveguide layers.

As shown in FIG. 11A, the substrate 40 is prepared. As the substrate 40, for example, a Si substrate can be used.

(2) Formation of the First Planar Optical Waveguides Layer (PLC Layer)

Figure 11B:
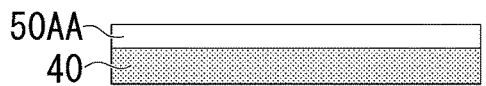
Figure 11C:
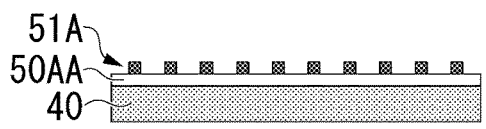
Figure 11D:
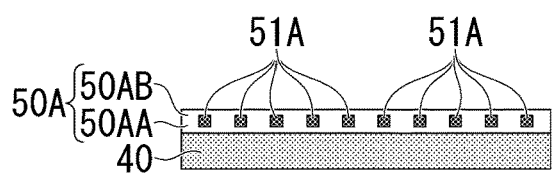

Next, as shown in FIGS. 11(b) to 11(d), a planar optical waveguides layer (PLC layer) 50A is formed on the substrate 40. First, as shown in FIG. 11B, a cladding layer (undercladding layer) 50AA is formed by a flame deposition method (FHD: Flame Hydrolysis Deposition) or the like. Next, as shown in FIG. 11C, the core layer 51A is formed by photolithography or reactive ion etching (ME). Next, as shown in FIG. 11D, a cladding layer (overcladding layer) 50AB is formed, and a first PLC layer 50A is formed.

(3) Formation of the Second Planar Optical Waveguides Layer (PLC Layer)

Figure 11E:
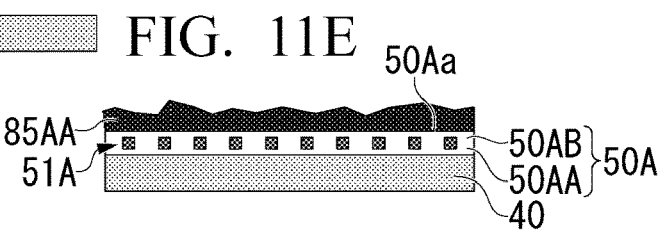
Figure 11F:
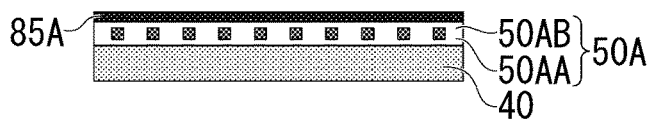
Figure 11G:
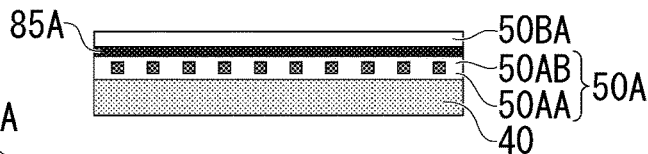
Figure 11H:
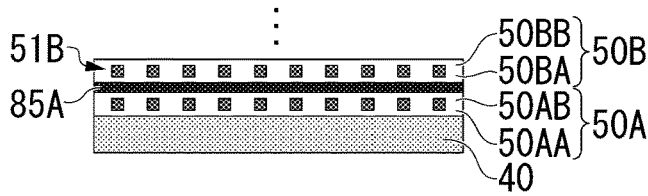

Next, as shown in FIGS. 11(e) to 11(h), a second planar optical waveguides layer (PLC layer) 50B is formed on the planar optical waveguides layer (PLC layer) 50A. First, as shown in FIG. 11E, a metal film 85AA is formed on the surface 50Aa of the first PLC layer 50A by sputtering or the like. As the metal film, for example, a metal film 85AA such as Ti, Ta, W or the like can be used. A metal film 85AA is formed along the unevenness (irregularities) of the surface of the first PLC layer. The surface of the metal film 85AA has surface unevenness due to unevenness on the surface of the PLC layer and variations in film formation of the metal film. Next, as shown in FIG. 11F, surface unevenness is reduced by a dry or wet surface flattening method (for example, chemical mechanical polishing such as CMP), and the base layer (consisting of a metal film) 85A for the second PLC layer is formed. Next, as shown in FIGS. 11G and 11H, the cladding layer (undercladding layer) 50BA of the second PLC layer is formed on the base layer 85A formed, the core layer 51B is formed, the cladding layer (overcladding layer) 50BB is formed, and the second PLC layer 50B can be formed, by the same method as shown in (2).

(4) Formation of the Third Planar Optical Waveguides Layer (PLC Layer)

A third or higher planar optical waveguides layer (PLC layer) can be laminated by the same method.

An example of a method for producing a laminated body in which a plurality of LD layers are laminated, which is provided in the integrated light source module as shown in FIGS. 9 and 10, will be described with reference to FIGS. 12A to 12G.

(1) Preparation of Subcarrier

As shown in FIG. 12A, a subcarrier 20 incorporating LD wiring, CMOS, and the like is prepared.

(2) Film Formation of Metal Film for LD Bonding

As shown in FIG. 12B, a metal film M for bonding an LD is formed on the subcarrier 20 in order.

(3) LD Mounting

As shown in FIG. 12C, the LD 30A of the first layer and the LD 30B of the second layer are mounted on the metal film M for bonding and then fixed. FIG. 12D is a perspective view of this state.

(4) Filling of Insulating Material

As shown in FIG. 12E, insulating material is filled to form the insulating material layer NM so that the LD 30A of the first layer and the LD 30B of the second layer do not collapse.

(5) Polishing of Insulating Material

As shown in FIG. 12F the insulating material layer NM is polished to light emitting portions of the LDs to prepare the LD portions.

(6) Joining the LD Part and the PLC Part

The LD portions are rotated 90 degrees and joined to the PLC portion to manufacture an integrated light source module.

Application Example

As an application example of the integrated light source module according to the present disclosure, a case where it is used as a printhead of an image forming apparatus adopting an electrophotographic method will be described.

Figure 13:
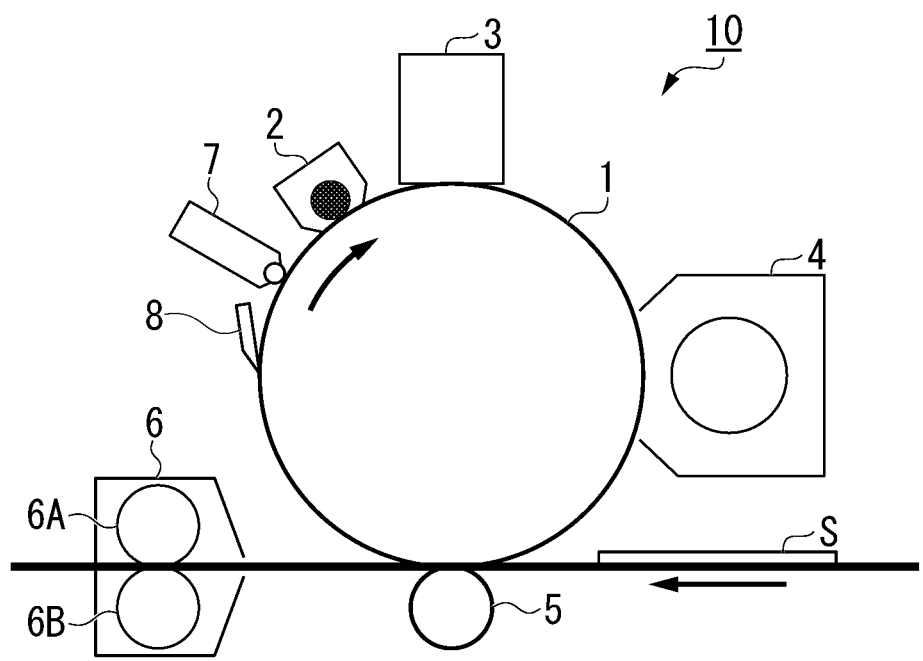
FIG. 13 is a schematic diagram of a typical image forming apparatus seen from the rotation axis direction of a photosensitive drum.
Figure 14:
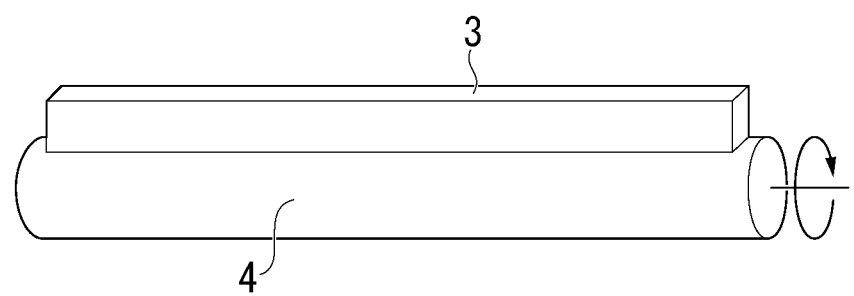
FIG. 14 is a schematic diagram of a photosensitive drum and a printhead seen almost from the side thereof.

FIG. 13 is a schematic schematic diagram of a typical image forming apparatus viewed from the rotation axis direction of a photosensitive drum (an object to be irradiated). FIG. 14 is a schematic schematic diagram of the photosensitive drum and the printhead as viewed from the side surface.

An image forming apparatus 10 shown in FIG. 13 includes a photosensitive drum 1 which is a drum-shaped image carrier unit and rotates in the direction of an arrow, an electrification unit 2 that charges the surface of the photosensitive drum 1, a printhead 3 to which an integrated light source module according to the present disclosure is applied, which is an exposure means for forming an electrostatic latent image on the photosensitive drum 1 charged by a charging unit 2, a developing unit 4 that develops an electrostatic latent image formed on a photosensitive drum 1 with toner to form a toner image, a transfer roller 5 that transfers the toner image on the photosensitive drum 1 onto a recording paper S, a fixing unit 6 for fixing the toner image transferred on the recording paper S, a static eliminator 7 that eliminates static electricity to remove toner remaining on the photosensitive drum 1, and a cleaner 8 that mechanically cleans the toner remaining on the photosensitive drum 1.

The electrophotographic process in the image forming apparatus 10 shown in FIG. 13 will be briefly described.

After charging the photosensitive drum 1 with the charging unit 2 (charging step), the photosensitive drum 1 is irradiated with the laser beam emitted from the printhead 3 to form an electrostatic latent image on the photosensitive drum 1 (exposure step). Next, the developing unit 4 adheres toner to the electrostatic latent image on the photosensitive drum 1 to form a toner image (developing step).

After that, the transfer unit 24 transfers the toner image formed on the photosensitive drum 1 to the recording paper S (transfer step), and the fixing unit 6 applies pressure and heat to the toner image transferred onto the recording paper S. Then, the toner is fused to the recording paper S and the toner is fixed (fixing step).

What is claimed is:

1. An integrated light source module, comprising:
a planar optical waveguides layer having N light incident ports aligned with respect to each other, M light exit ports aligned with respect to each other, and optical waveguides connected to the N light incident ports and the M light exit ports; and
N laser diodes or light emitting diodes facing each of the N light incident ports so that light emitted from each of the N laser diodes or light emitting diodes can be incident on each of the N light incident ports;
a substrate with the planar optical waveguides layer on an upper surface of the substrate; and
a subcarrier with the N laser diodes or light emitting diodes on an upper surface of the subcarrier;
wherein the substrate is connected to the subcarrier via a metal layer, and light emitted from the M light exit ports can be applied to an object to be irradiated.

2. The integrated light source module according to claim 1, wherein the number of the light incident ports (N) and the number of the light exit ports (M) are different.

3. The integrated light source module according to claim 1, wherein the number of the light exit ports (M) is less than the number of the light incident ports (N).

4. The integrated light source module according to claim 1, wherein the number of the light exit ports (M) is larger than the number of the light incident ports (N).

5. The integrated light source module according to claim 1, wherein at least some intervals between the N light incident ports adjacent to each other are different.

6. The integrated light source module according to claim 1, wherein at least some of the N laser diodes output laser light with a frequency different from that of others of the laser diodes.

7. The integrated light source module according to claim 1, wherein all of the N laser diodes output laser light having the same frequency, and the frequencies of the laser lights output from at least some of the M light exit ports of the planar optical waveguides layer are different.

8. The integrated light source module according to claim 1, wherein the integrated light source module is a printhead.

9. The integrated light source module according to claim 1, wherein a plurality of the planar optical waveguides layers are laminated, and a plurality of layers of the N laser diodes or light emitting diodes corresponding to the plurality of the planar optical waveguides layers are laminated.

10. The integrated light source module according to claim 1, wherein a reflective film is provided between the planar optical waveguides layers arranged adjacent to each other.

11. The integrated light source module according to claim 1, wherein a gap between the substrate and the subcarrier is 5 µm or less.

12. The integrated light source module according to claim 1, wherein the interval between adjacent light incident ports of N light incident ports is 10 µm or more and 1000 µm or less.

13. The integrated light source module according to claim 1, wherein the interval between adjacent light exit ports of M light exit ports is 10 µm or more and 1000 µm or less.

* * * * *